(12) United States Patent
Wilson

(10) Patent No.: US 7,241,098 B1
(45) Date of Patent: *Jul. 10, 2007

(54) HAY BALE LOADER AND HAULER

(76) Inventor: Gary W. Wilson, 4183 Greenville Rd., Elkton, KY (US) 42220

( * ) Notice: Subject to any disclaimer, the term of this patent is extended or adjusted under 35 U.S.C. 154(b) by 0 days.

This patent is subject to a terminal disclaimer.

(21) Appl. No.: 11/324,372

(22) Filed: Jan. 3, 2006

Related U.S. Application Data

(63) Continuation-in-part of application No. 10/260,632, filed on Sep. 30, 2002, now Pat. No. 7,004,706.

(60) Provisional application No. 60/357,274, filed on Feb. 15, 2002, provisional application No. 60/326,246, filed on Oct. 1, 2001.

(51) Int. Cl.
*A01D 87/12* (2006.01)

(52) U.S. Cl. .................. 414/111; 414/24.5; 414/502

(58) Field of Classification Search .............. 414/24.5, 414/111, 501–503, 789.7; 294/120, 61
See application file for complete search history.

(56) References Cited

U.S. PATENT DOCUMENTS

| | | | |
|---|---|---|---|
| 2,848,127 A * | 8/1958 | Grey ................... 414/789.3 |
| 4,043,461 A * | 8/1977 | Castro ..................... 198/374 |
| 4,076,138 A | 2/1978 | Honomichl, Sr. |
| 4,101,081 A * | 7/1978 | Ritter et al. ........... 241/101.74 |
| 4,117,940 A | 10/1978 | Adam |
| 4,182,590 A | 1/1980 | Harkness |
| 4,249,842 A | 2/1981 | Johnson |
| 4,329,101 A | 5/1982 | Green et al. |
| 4,329,102 A | 5/1982 | Gray |
| 4,376,607 A | 3/1983 | Gibson |
| 4,441,845 A * | 4/1984 | Gibson ................... 414/24.6 |
| 4,498,829 A * | 2/1985 | Spikes ................... 414/24.5 |
| 4,549,840 A * | 10/1985 | Ansbjer ................. 414/24.5 |
| 4,909,694 A | 3/1990 | Peters et al. |
| 5,062,757 A | 11/1991 | Eichenauer |
| 5,333,981 A * | 8/1994 | Pronovost et al. ......... 414/24.5 |
| 5,340,259 A | 8/1994 | Flaskey |
| 5,405,229 A * | 4/1995 | Tilley et al. ............. 414/111 |
| 5,618,146 A | 4/1997 | Cooper |
| 5,630,689 A | 5/1997 | Willis |
| 5,639,199 A | 6/1997 | Connell, Jr. |
| 5,651,653 A | 7/1997 | Bablo |
| 5,664,923 A | 9/1997 | Olin |
| 5,690,461 A * | 11/1997 | Tilley ...................... 414/111 |

(Continued)

*Primary Examiner*—Dean J. Kramer
(74) *Attorney, Agent, or Firm*—Waddey & Patterson, P.C.; Phillip E. Walker

(57) ABSTRACT

The present invention provides an apparatus for loading, transporting, and unloading hay bales. This apparatus comprises a trailer frame including a first side and length, a conveyor device attached to the trailer frame, a loading system attached to the first side of the trailer frame, and a hay bale retrieving device pivotally attached to the loading system. The loading system includes a movement deck and a movement arm positioned to move the hay bales across the movement deck and to the trailer frame. The hay bale retrieving device is positioned to transport the hay bales to the movement deck. The loading system, including the movement deck, movement arm and hay bale retrieving device, can be supported by a storable wheeled support that is preferably rotatable 360 degrees. Additionally, the weight of the loading system and hay bales can be offset by a storable counter weight system.

18 Claims, 22 Drawing Sheets

U.S. PATENT DOCUMENTS

| | | |
|---|---|---|
| 5,769,587 A | 6/1998 | Gilfoil et al. |
| 6,019,562 A | 2/2000 | Cheatham |
| 6,106,209 A | 8/2000 | Krenek |
| 6,312,205 B1 * | 11/2001 | Vandenberg ............... 414/24.5 |
| 7,004,706 B1 * | 2/2006 | Wilson ....................... 414/111 |

* cited by examiner

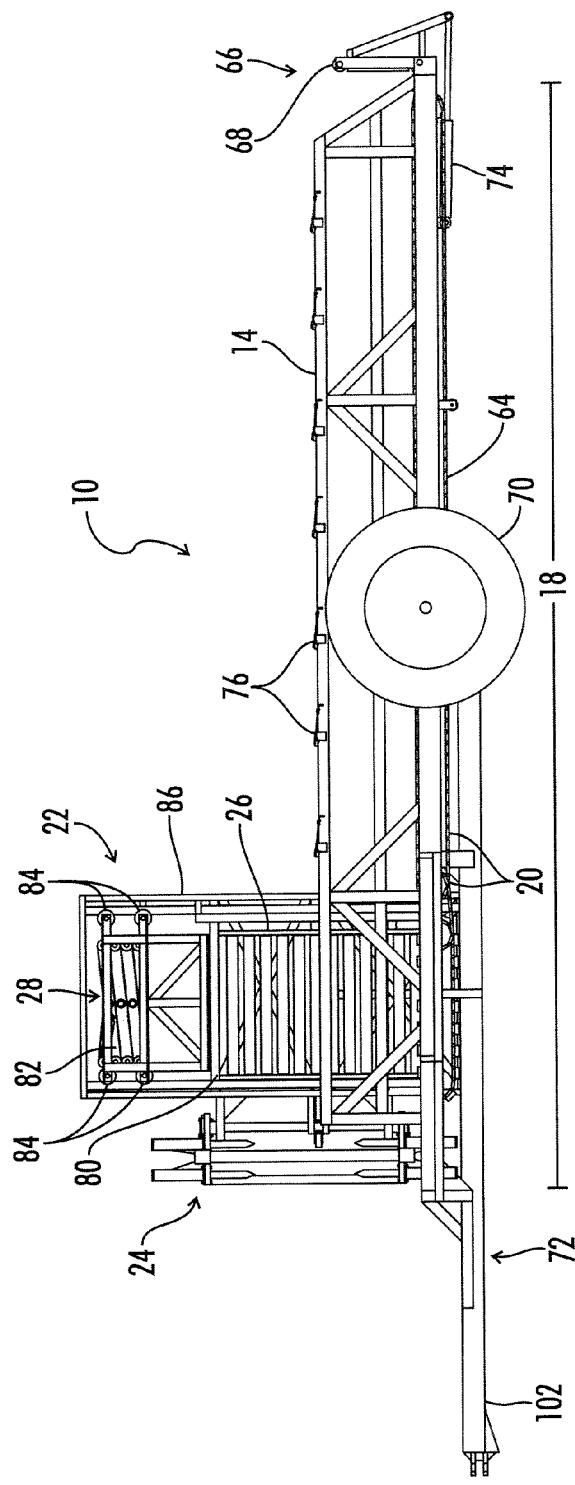

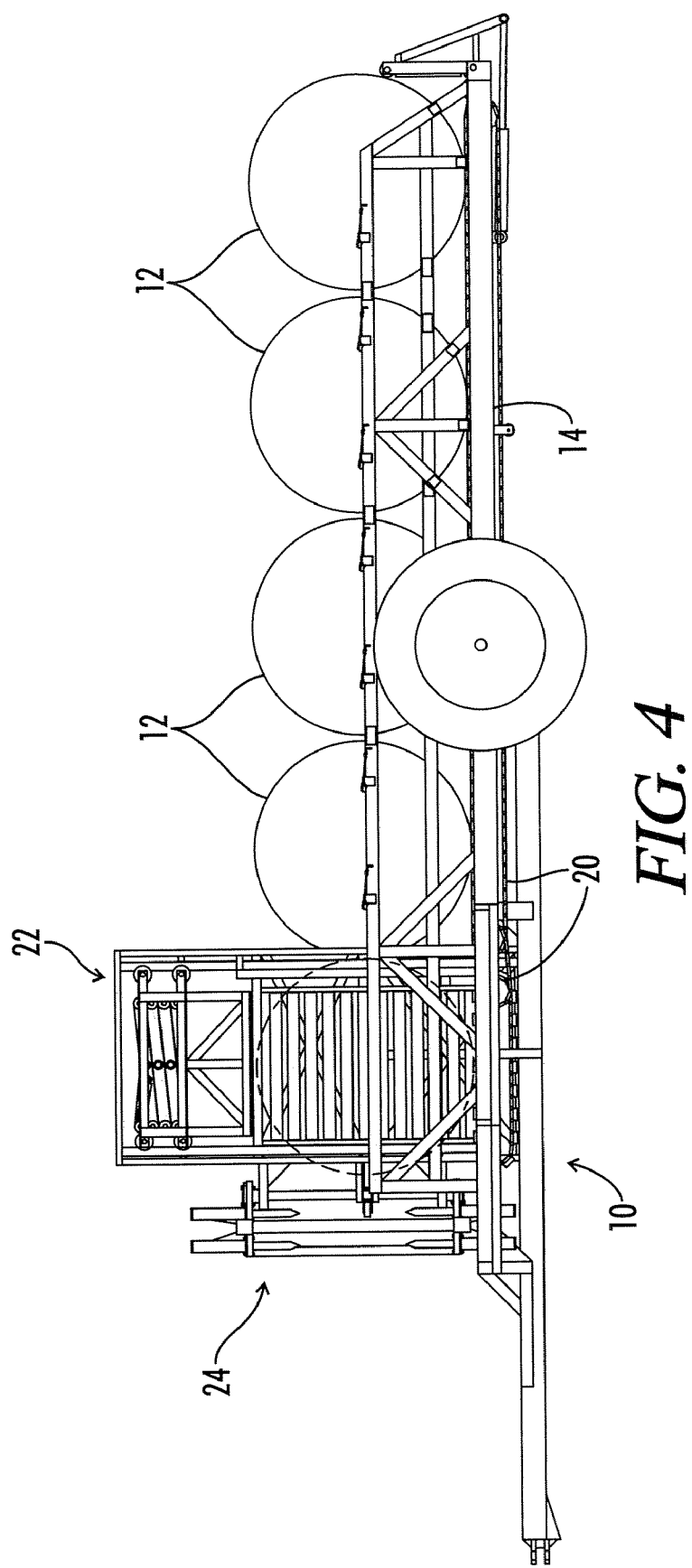

HAY BALE LOADER AND HAULER

This application is a continuation in part of U.S. patent application Ser. No. 10/260,632 filed Sep. 30, 2002, now U.S. Pat. No. 7,004,706 entitled "Hay Bale Loader and Hauler", which claims the benefit of U.S. Provisional Patent Application Ser. No. 60/326,246 filed Oct. 1, 2001, entitled "Hay Bale Loader and Hauler," and U.S. patent Ser. No. 60/357,274 filed Feb. 15, 2002, entitled "Hay Bale Loader and Hauler", all of which are incorporated by reference in their entireties.

Be it known that I, Gary W. Wilson, a citizen of the United States, residing at 4183 Greenville Road, Elkton, Ky. 42220; have invented a new and useful "Improved Hay Bale Loader and Hauler."

FIELD OF THE INVENTION

This invention relates to the field of agricultural equipment, and more particularly to an apparatus to handle, retrieve, transport, and unload large bales of agricultural material, particularly, but without limitation, round bales of hay.

BACKGROUND OF THE INVENTION

It is common practice to transport hay and other agricultural products as needed from one location to another as needed. Hay is usually baled into large bales that can weigh several hundred pounds. A bale can have a cylindrical or rectangular geometry and can weigh between fifteen hundred to three thousand pounds. Obviously, the task of moving these enormous bales is outside the realm of pure manual labor. Therefore, an apparatus to retrieve, transport, and unload these enormous bales is required.

Several bale loaders are known in the prior art. For example, U.S. Pat. Nos. 4,076,138, 4,249,842, and 4,329,102 disclose various types of round bale loaders and carriers. However, these prior art carriers have loading devices used to scoop the hay bale off the ground and load it into a trailer type structure. This scooping motion can run into difficulty when the hay bales are not on level ground or if the hay bales do not exactly match the dimensions required to perfectly fit into the loading devices of these prior art carriers.

Other prior art hay bale carriers have attempted to overcome these shortcomings but have yet to adequately and efficiently load, unload, and haul hay bales. For example, U.S. Pat. No. 5,240,259 requires the trailer apparatus to be perfectly positioned beside the hay bale as an upper frame assembly surrounds the hay bale before attempting to lift the hay bale onto the trailer. This perfect positioning requirement is slow and inefficient in the loading of hay bales onto a trailer.

Also, U.S. Pat. No. 6,019,562 attempts to clamp hay bales between gripping arms in order to lift the hay bales onto a trailer. During the course of this clamping the hay bales can slide or fall out of the gripping arms, therefore complicating the loading process.

Thus there is a need in the art for an apparatus to handle, retrieve, transport, and unload large bales of agricultural material.

SUMMARY OF THE INVENTION

The present invention provides an apparatus for loading, transporting, and unloading hay bales. This apparatus comprises a trailer frame including a first side and length, a conveyor device attached to the trailer frame, a loading system attached to the first side of the trailer frame, and a hay bale retrieving device pivotally attached to the loading system. The conveyor device is positioned to transport the hay bales the majority of the length of the trailer frame, while the loading system includes a movement deck and a movement arm positioned to move the hay bales across the movement deck and to the trailer frame. The hay bale retrieving device is positioned to transport the hay bales to the movement deck and includes a first spike and a second spike positioned to oppose the first spike. A first position is attached to the first spike and a second position is attached to the second spike. The first and second pistons are positioned to removably impale the first and second spikes onto the hay bales.

Also included on the apparatus are an adjustable support wheel and an adjustable counter-weight system. The support wheel is preferably attached to the loading system opposite the trailer frame and is more preferably attached to the end of the movement deck opposite the trailer frame. The support wheel can be pivotally attached to the loading system to rotate between horizontal and vertical positions about an axis of rotation. The axis of rotation can be parallel to the movement deck or, alternately, intersect the movement deck.

The adjustable counterweight system is attached to the trailer frame and positioned substantially opposite the loading system. The counterweight system is designed to offset the weight of the loading system and hay bales as the hay bales are loaded onto the apparatus. The counterweight system can be pivotally attached to the trailer frame and includes an axis of rotation parallel to the trailer frame. The counterweight system is positioned to rotate about the axis of rotation between horizontal and vertical positions to facilitate balancing of the apparatus during operation and transfer.

A vehicle for loading, transporting, and unloading hay bales is also disclosed. The vehicle comprises a vehicle frame including a loading end and a length, an engine attached to the vehicle frame, a conveyor device attached to the vehicle frame and positioned to transport the hay bales the majority of the length of the vehicle frame, and a hay bale retrieving device pivotally attached to the loading end. The hay bale retrieving device includes a first spike and second spike positioned to oppose the first spike, both spikes positioned to engage the hay bales and lift the hay bales onto the frame. The vehicle is a self-contained unit designed to load, transport, and unload the hay bales without the need for an independent drive mechanism.

It is therefore the general object of the present invention to provide an apparatus for retrieving, transporting, and unloading hay bales.

Another object of the present invention is to provide a vehicle for loading, transporting, and unloading hay bales.

Still another object of the present invention is to provide an apparatus that removably impales hay bales in order to load hay bales onto a frame.

Yet another object of the present invention is to provide an apparatus that has increased storage capacities for hay bales.

Still yet another object of the present invention is to provide an apparatus that has multiple level storage capacity used to load, transport, and unload hay bales.

Another object of the present invention is to provide an apparatus capable of turning hay bales to desired orientations once the hay bales are loaded onto the apparatus in order to increase the loading capacity and the transport characteristics of the apparatus.

Other further objects, features, and advantages of the present invention will be readily apparent to those skilled in the art upon a reading of the following disclosure when taken in conjunction with the accompanying drawings.

BRIEF DESCRIPTION OF THE DRAWINGS

FIG. 2 is a side view of the apparatus of the present invention with the loading system and hay bale retrieving device raised to the transport position.

FIG. 3 is a front view of the apparatus of the present invention.

FIG. 4 is a side view of the apparatus of the present invention shown with hay bales loaded onto the trailer frame.

FIG. 6 shows a continuation of the raising of the loading system and the hay bale retrieving device.

FIG. 7 shows the complete transformation of the loading system and the hay bale retrieving device into the transport position.

FIG. 9 shows the hay bale retrieving device commencing the upward rotation towards the movement deck of the loading system.

FIG. 10 shows the completed rotation of the hay bale retrieving device to the movement deck.

FIG. 12 shows the rotational transfer platform commencing its rotational turn.

FIG. 13 shows the rotational transfer platform completing a 90-degree turn in order to offload a hay bale to the receiving frame the conveyor device.

FIG. 14 shows both a top and bottom view of the rotational transfer platform.

FIG. 16 shows the rotational transfer platform after it has completed a 90-degree turn in order to facilitate transfer of the hay bale onto the conveyor device.

FIG. 17 shows the push cylinder commencing engagement of the hay bale and transferring the hay bale to the receiving frame and the conveyor device.

FIG. 18 shows the push cylinder completing the extension of the rod and fully moving the hay bale onto the receiving frame and the conveyor device.

FIG. 19 shows the first hay bale being indexed backwards on the conveyor device and a second hay bale moving onto the rotational platform. FIG. 19 also shows the push cylinder fully retracted.

FIG. 23 shows the lifting system raising the top front gate and inserting a hay bale onto the top trailer frame.

FIG. 24 shows hay bales being unloaded off the base trailer frame.

FIG. 25 shows the unloading of the hay bales from the top trailer frame.

FIG. 29 shows the wheeled support attached to the loading system and the counterweight system positioned substantially horizontal when the apparatus is in use. The attachment area and connection neck have been removed for ease of illustration.

FIG. 30 shows an example of the wheeled support and counterweight system positioned during operation of the apparatus.

FIG. 31 shows the counterweight system, loading deck, and wheeled support positioned for transfer of the apparatus.

FIG. 34 shows a wheel in a horizontal position which can be used during transfer of the apparatus.

FIG. 35 shows the wheel in a vertical position which can be used in operation of the apparatus.

DESCRIPTION OF THE PREFERRED EMBODIMENTS

Trailer Embodiment

Figure 1:
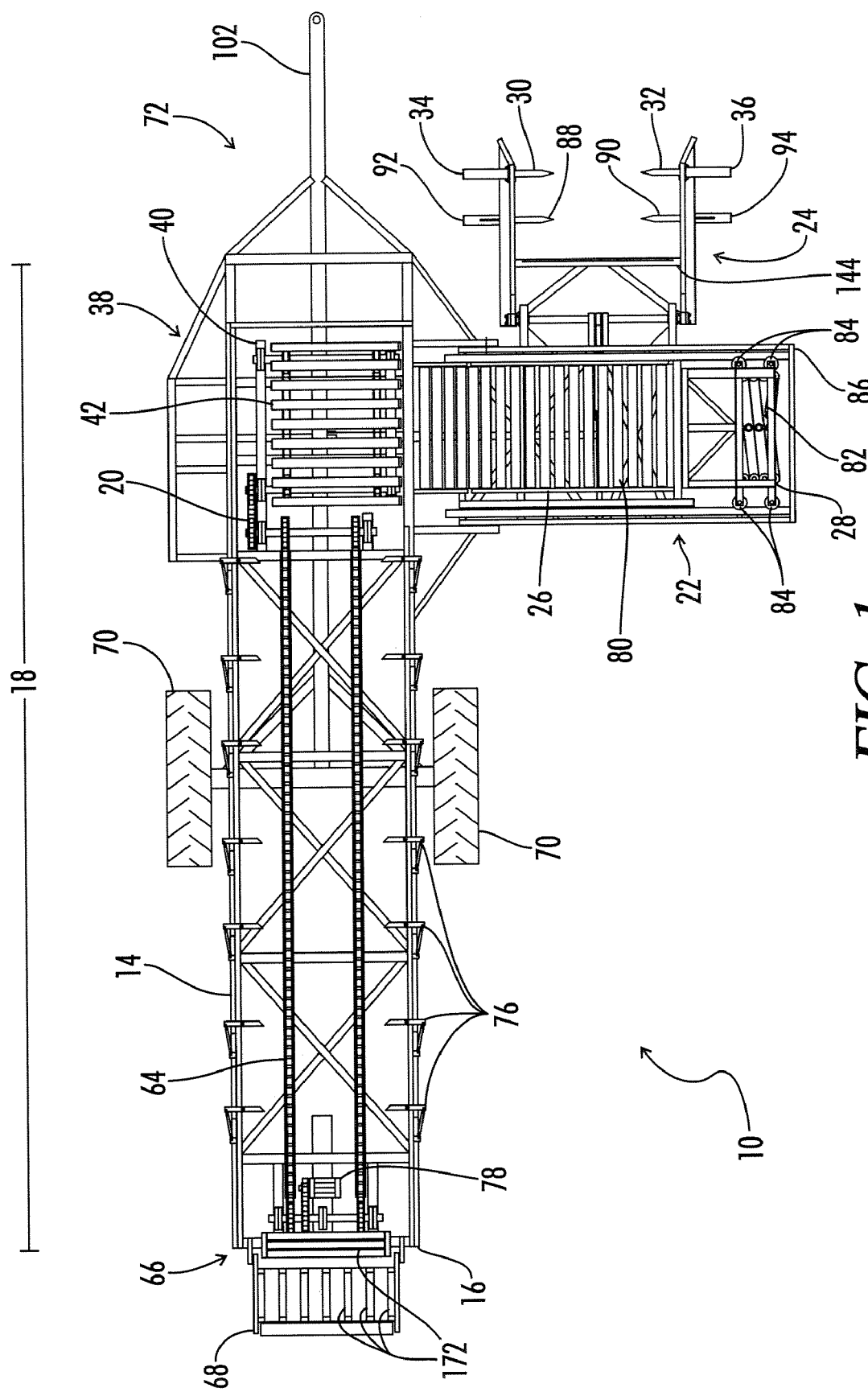
FIG. 1 shows a top view of one embodiment of the apparatus of the current invention.

Referring now to FIG. 1, the apparatus of the present invention shown is generally designated by the numeral 10. The apparatus 10 is for loading, transporting, and unloading hay bales 12. The apparatus 10 comprises a trailer frame 14 including a first side 16 and a length 18, a conveyor device 20 attached to the trailer frame 14, a loading system 22 attached to the first side 16 of the trailer frame 14, and a hay bale retrieving device 24 pivotally attached to the loading system 22. The conveyor device 20 is positioned on the trailer frame 14 to transport the hay bales 12 the majority of the length 18 of the trailer frame 14. The loading system 22, also known as a loading arm frame 22 or a loading frame roller deck 22, includes a movement deck 26 and a movement arm 28 positioned to move the hay bales 12 across the movement deck 26 into the trailer frame 14. The hay bale retrieving device 24 is positioned to transport hay bales 12 to the movement deck 26. The hay bale retrieving device 24 includes a first spike 30 and a second spike 32 positioned on the retrieving device 24 opposed to the first spike 30. Also included is a first piston 34 attached to the first spike 30 and a second piston 36 attached to the second spike 32, wherein the first and second pistons 34 and 36 are positioned to removably impale the first and second spikes 30 and 32 into the hay bales 12.

In a preferred embodiment, the trailer frame 14 includes a loading end 38 and a transfer platform 40 located near the loading end 38. The transfer platform 40 includes a carrier track 42 positioned to transfer the hay bales 12 to the conveyor device 20. The carrier track 42 can be numerous conveyor type tracks known in the industry to transport materials from one location to the next, including, but not limited to, a slat conveyor, a chain conveyor, a roller conveyor, or other conveyor types and still maintain the inventive spirit of this invention.

The transfer platform 40, which can also be called a rotating wheel mechanism 40, a rotating frame 40, or a receiving wheel 40, is designed to accept the hay bales 12 from the movement deck 26 of the loading system 22 and transition the hay bales 12 to the conveyor device 20. In one embodiment, the transfer platform 40 further includes a plurality of rotational devices 44 engaging the trailer frame 14 and positioned to rotate the transfer platform 40 relative to the trailer frame 14. Through the use of the rotational devices 44, the transfer platform 40 has the capability of rotating in a preferred range of 0 to 180 degrees and a most preferred range from 0 to 90 degrees, where the zero degree measurement is taken to be perpendicular to the first side 16 of the trailer frame 14.

Figure 11:
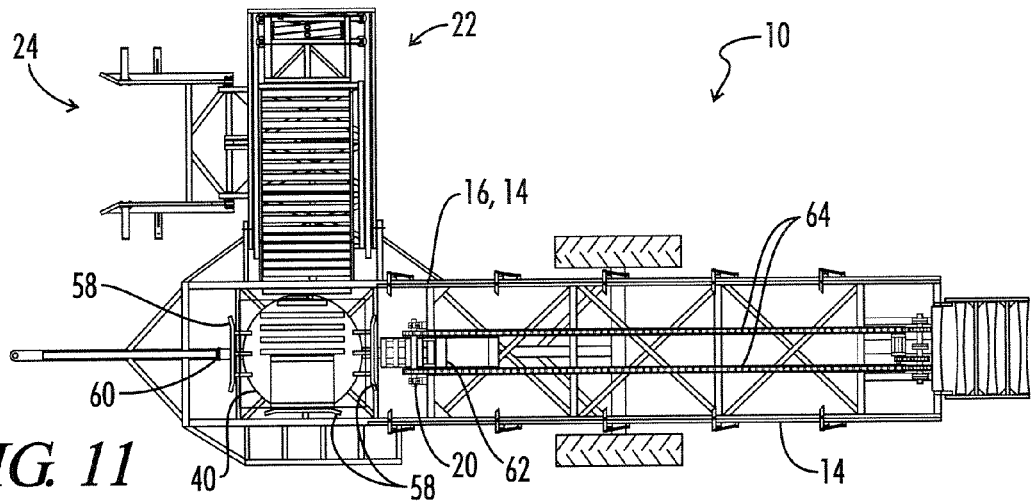
FIG. 11 is a top view of an apparatus of the current invention shown including the rotational transfer platform.
Figure 12:
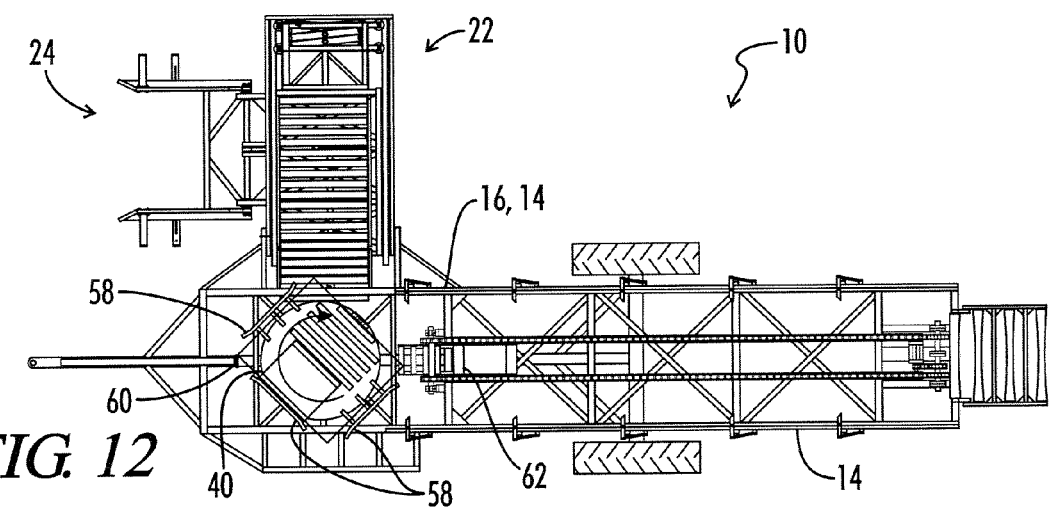
FIG. 12 is a top view similar to FIG. 11.
Figure 13:
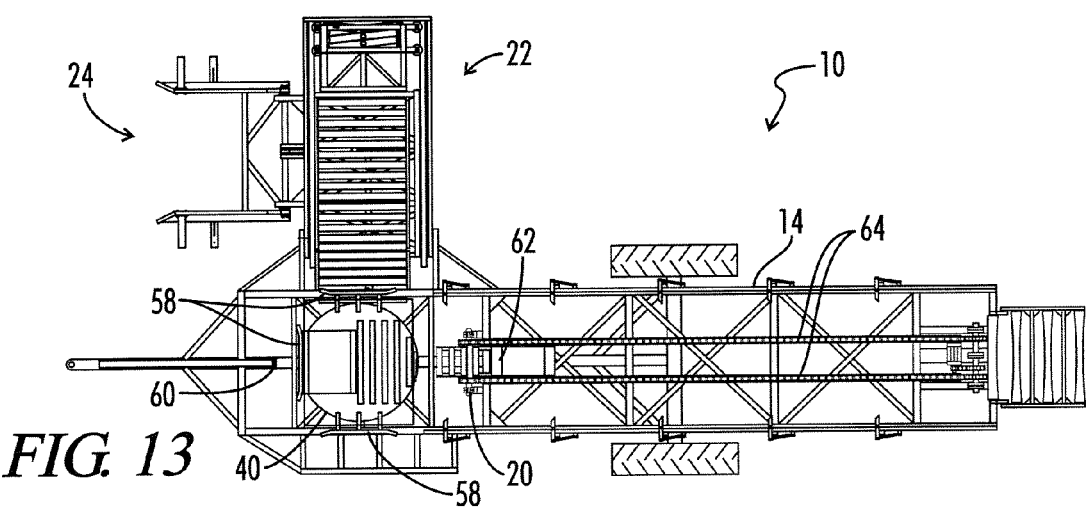
FIG. 13 is a top view similar to FIGS. 11 and 12.
Figure 14:
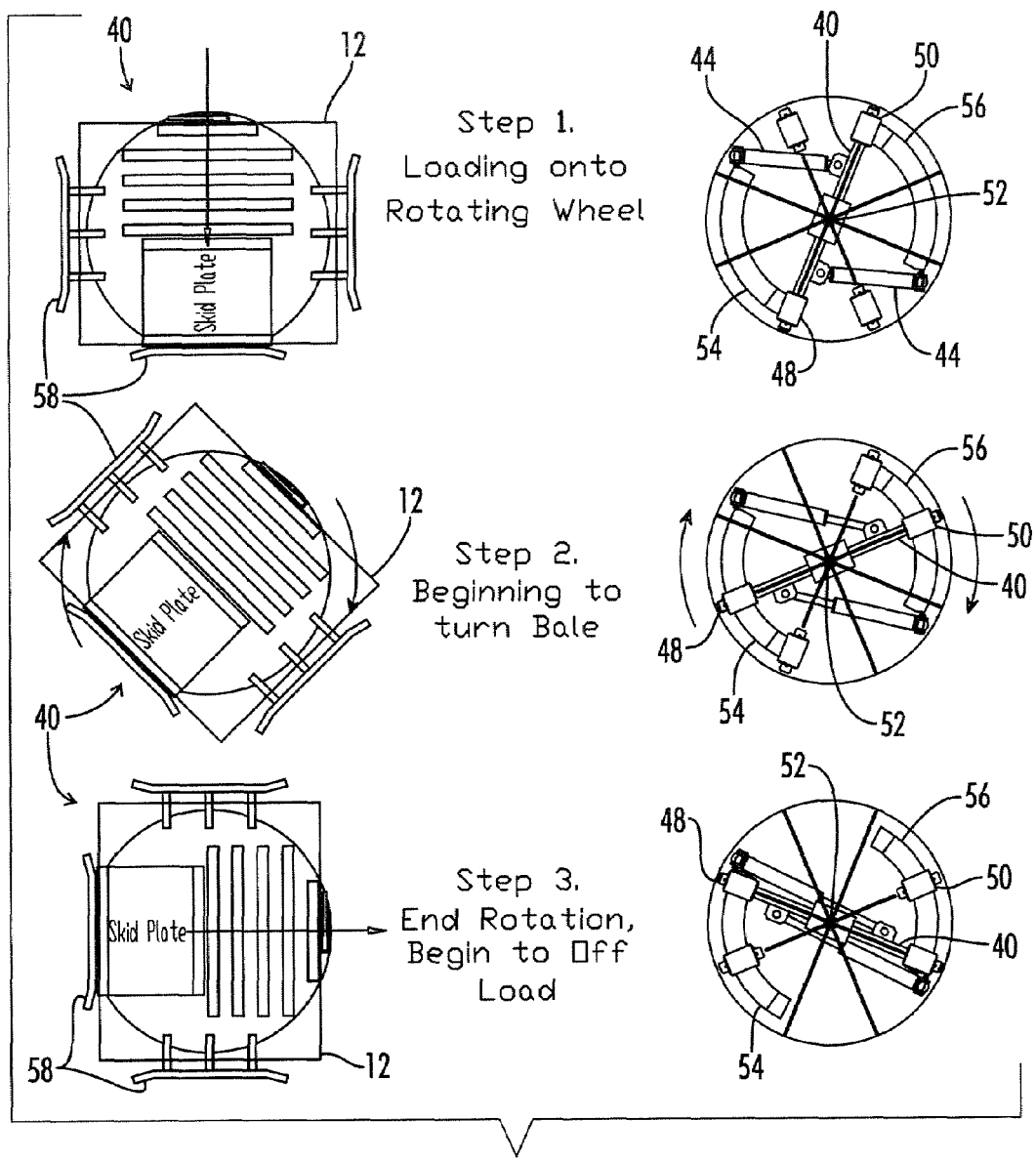
FIG. 14 is a series of isolated views showing the rotational transfer platform.

Once the hay bales 12 reach the transfer platform 40, the transfer platform 40 rotates at least ninety (90) degrees, thereby changing the orientation of the hay bales 12 with respect to the trailer frame 14. This rotation of the hay bales 12 is designed to facilitate increased capacity on the apparatus 10. As seen in FIG. 11, the transfer platform 40 faces the loading system 22 to accept the hay bales 12. As the loading system 22 moves the hay bales 12 to the transfer platform 40, the transfer platform 40 accepts the hay bales 12. The transfer platform 40 is rotated by the plurality of rotational devices 44.

The rotational devices 44 include piston cylinders 44 attached to a center axis rod 46 which includes two roller ends 48 and 50. These piston cylinders 44 extend causing the center axis rod 46 to rotate about center point 52. Roller ends 48 and 50 arc through roller channels 54 and 56 to maintain the rotational movement of the transfer platform 40. The combination of the roller ends 48 and 50 and the roller channels 54 and 56 combine to raise the transfer platform 40 to an increased height level as the transfer platform 40 rotates through its arc. This raised height allows for a more efficient transfer of the hay bales 12 to the conveyor device 20. The plurality of rotational devices 44 can also include a rotational drive shaft affixed to the center point 52 of the center axis rod 46 or other standard rotational devices known in the industry and still maintain the inventive integrity of this invention.

Figure 15:
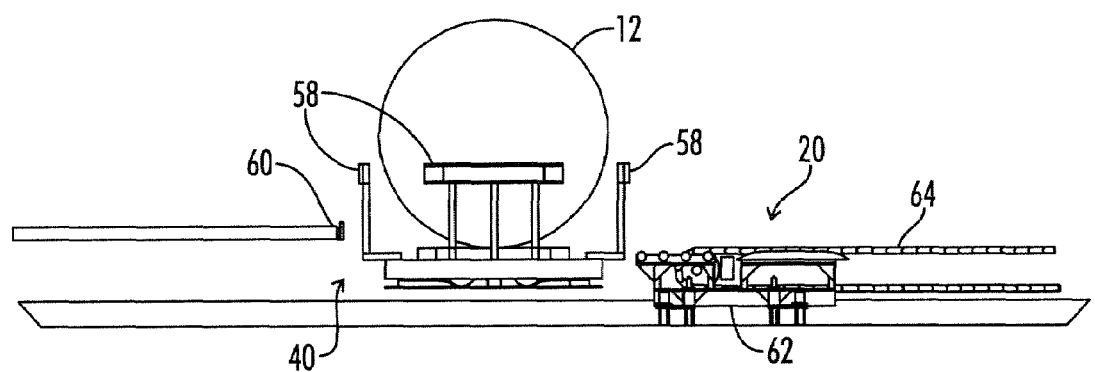
FIG. 15 is an isolated view of the rotational transfer platform, a hay bale, and the transfer of the hay bale off the rotational transfer platform and onto the conveyor device.
Figure 16:
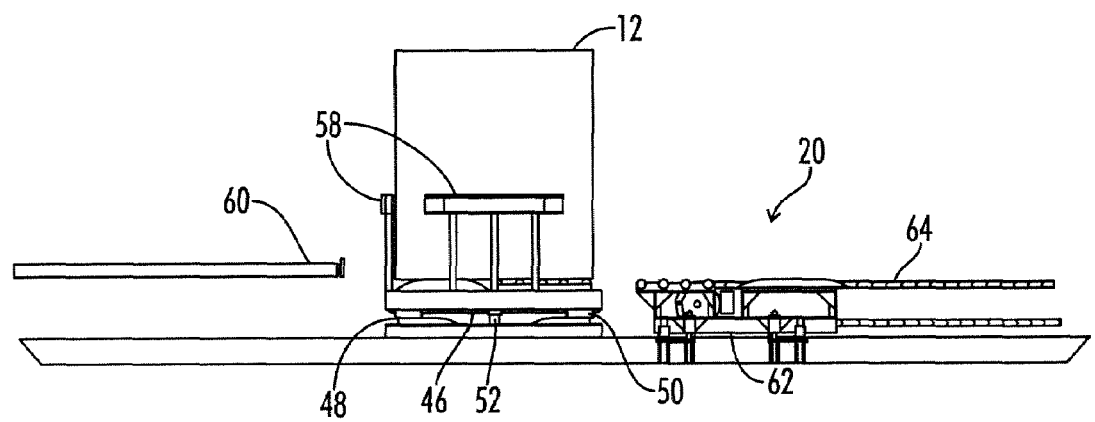
FIG. 16 is an isolated view similar to FIG. 15.
Figure 17:
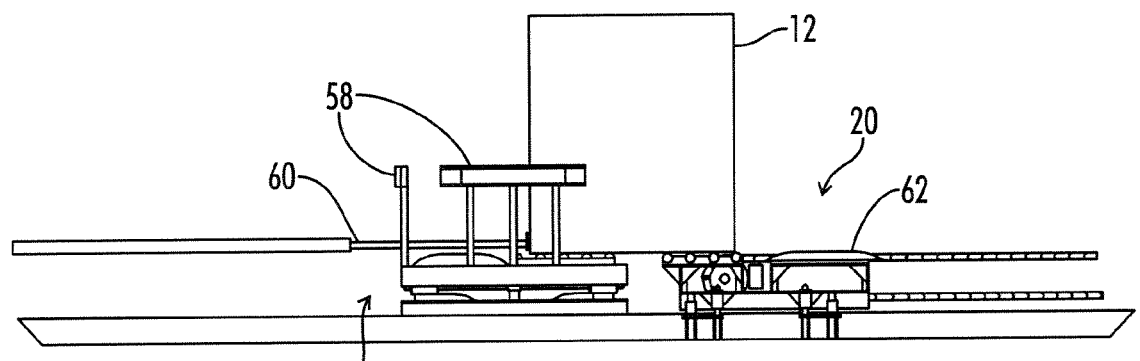
FIG. 17 is an isolated side view similar to FIGS. 15 and 16.
Figure 18:
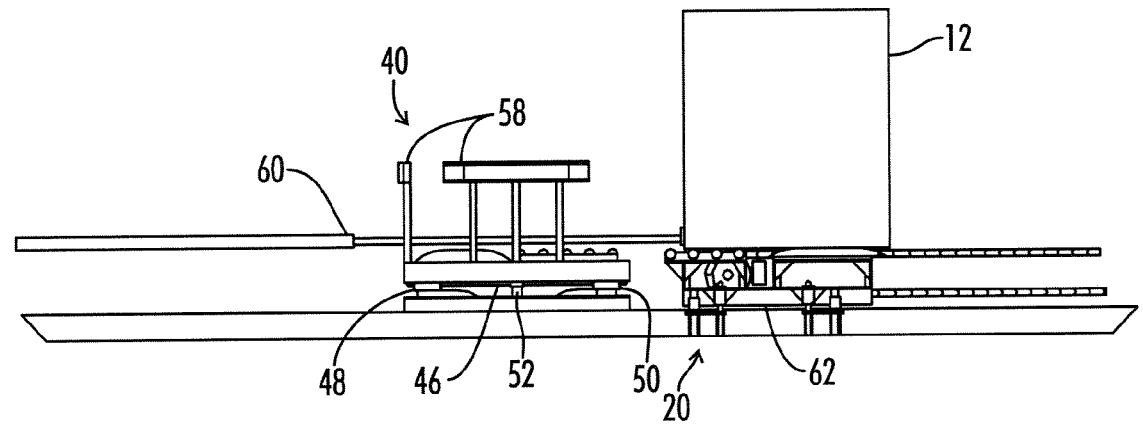
FIG. 18 is an isolated side view similar to FIGS. 15 through 17.
Figure 19:
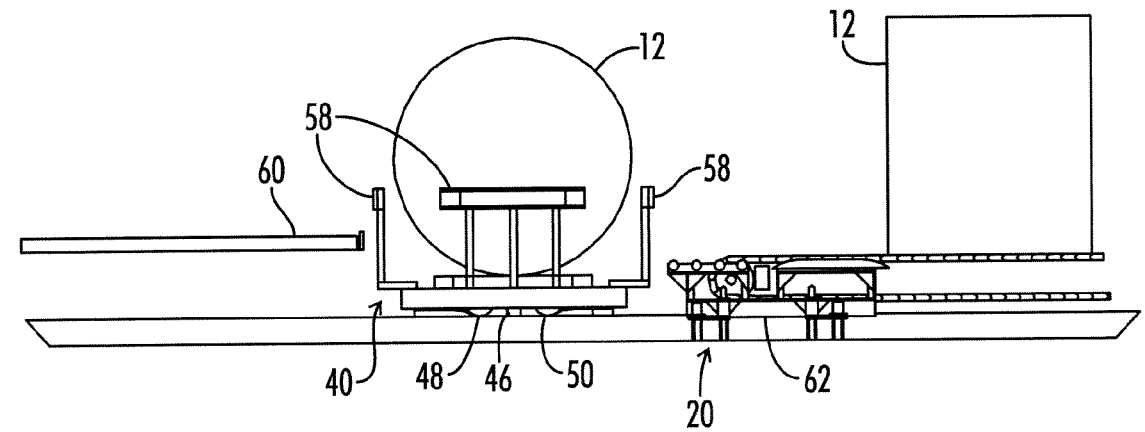
FIG. 19 is an isolated side view similar to FIGS. 15 through 18.
Figure 20:
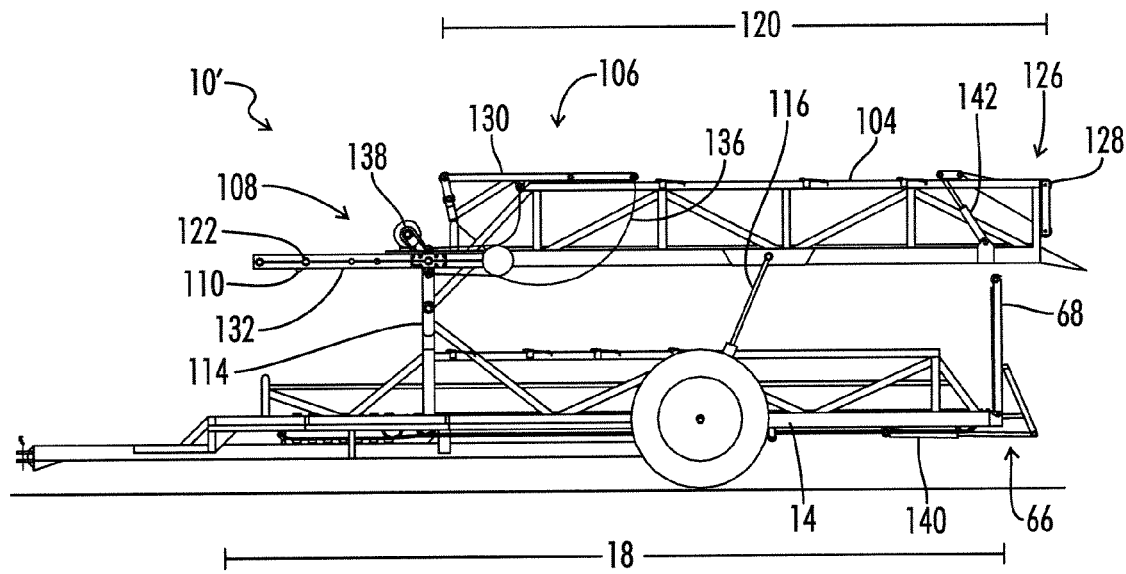
FIG. 20 is a side view of an apparatus of the current invention shown with a base trailer frame and a top trailer frame.
Figure 21:
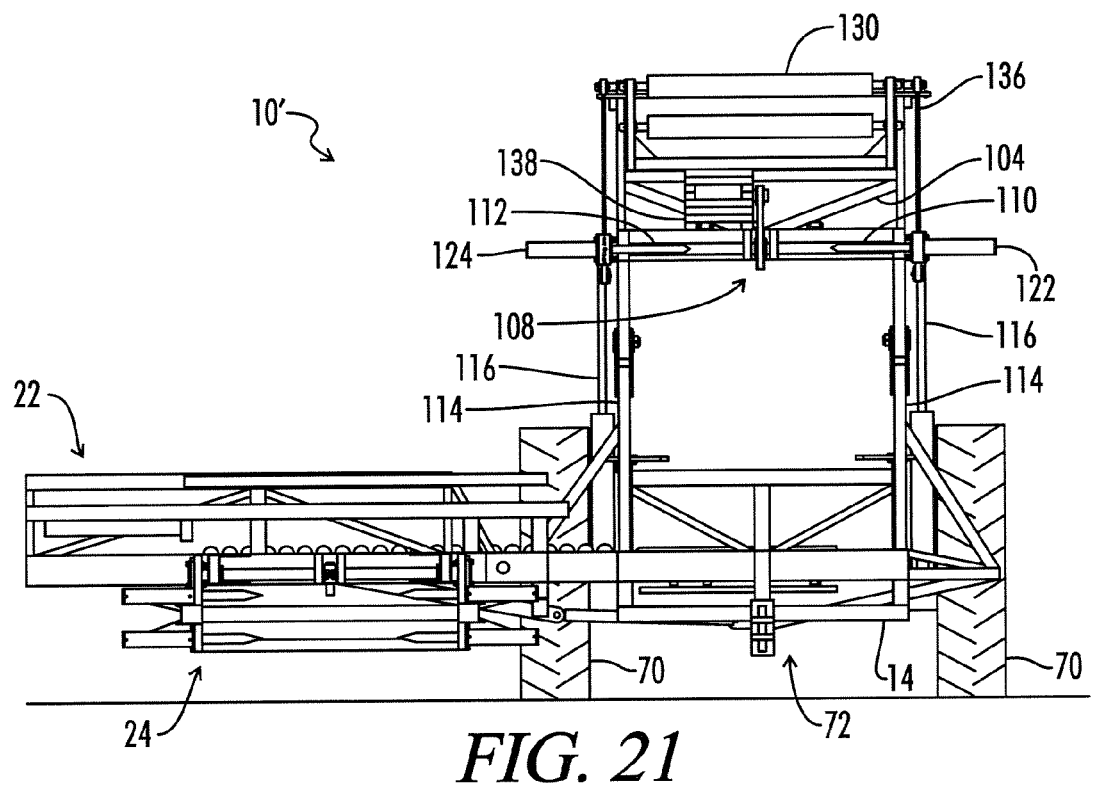
FIG. 21 is a front view of an apparatus of the current invention shown with a base trailer frame and a top trailer frame.

As seen in FIG. 15, the transfer platform 40 is shown with guide rails 58 used to direct the hay bales 12 onto the transfer platform 40 and to keep the hay bales 12 from extending off the transfer platform 40 in an untimely manner.

Once the transfer platform 40 rotates ninety degrees to align with the conveyor device 20, a push cylinder 60 engages the hay bale 12 and moves the hay bale 12 to the conveyor device 20. The push cylinder 60 then retreats back to its original position, as the conveyor device 20 indexes the hay bale 12 towards the loading end 38 of the trailer frame 14. Then the rotational devices 44 retract causing the transfer platform 40 to rotate back in alignment with the loading system 22 to accept another hay bale 12.

The conveyor device 20 includes a receiving frame 62 designed to raise above the conveyor track 64 in order to accept the hay bales 12 as the push cylinder 60 moves the hay bales 12 off the transfer platform 40. Once the hay bales 12 are fully moved to the receiving frame 62, the receiving frame 62 drops below the level of the conveyor track 64 to allow the conveyor track 64 to move the hay bales 12 towards the loading end 38 of trailer frame 14.

The trailer frame 14 includes an unloading end 66 and a rear gate 68. Pivotally attached to the unloading end 66 and positioned to release the hay bales 12 as the hay bales 12 approach the unloading 66 of the trailer frame 14. The trailer frame 14 includes a plurality of tires 70 positioned to support the weight of the apparatus 10 and the hay bales 12. The unloading end 66 of the trailer frame 14 includes an unloading cylinder 74 attached to the rear gate 68 and designed to raise and lower the rear gate 68 to allow hay bales 12 to exit the trailer frame 14.

Also, the trailer frame 14 includes an attachment area 72 designed to connect with a vehicle (not shown) in order for the vehicle to transport the apparatus 10. The trailer frame 14 also includes the hydraulic or electrical connections (not shown) needed to operate the mechanical features of the apparatus 10. The hydraulic and electrical connections traverse the attachment areas 72 to connect with the vehicle used to transport the apparatus 10. The trailer frame 14 includes a connection neck 102 designed to interact with a vehicle, such as a tractor or truck, in order to transport the apparatus 10. The connection neck 102, which can also be described as a tongue 102, a trailer hitch 102, or a gooseneck hitch 102, can include numerous designs and shapes known in the art to facilitate engagement between a vehicle and a trailer. For example, but not by way of limitation, the connection neck 102 can be designed to connect to a tractor, to a standard pickup truck, or have a "gooseneck" shape to engage vehicles designed to accept the "gooseneck" connection.

The trailer frame 14 also includes a plurality of indexing members 76 located along the length 18 of the trailer frame 14. The indexing members 76 are used to facilitate the individual locations of the hay bales 12 as the hay bales are loaded on the apparatus 10. These indexing members 76 also help secure the hay bales 12 as the hay bales 12 are being transported on the apparatus 10.

The conveyor device 20 indexes each hay bale 12 back along the length 18 of the trailer frame 14 to allow a new hay bale 12 to be placed on the conveyor device 20. The indexing is facilitated through the use of a plurality of conveyor tracks 64 positioned to engage the hay bales 12 and transport the hay bales 12 the majority of the length 18 of the trailer frame 14. These conveyor tracks 64 include, but not limited to, slat type conveyor tracks, smooth plated chain conveyor tracks, roller conveyor tracks, and other types of conveyor tracks known in the art to transport items from one location to the next.

The conveyor device 20 also includes a drive device 78 positioned to engage and rotate the conveyor tracks 64. In a preferred embodiment, the drive device 78 is an engine located near the unloading end 66 of the trailer frame 14. This drive device 78 transfers the conveyor tracks 64 along the length 18 of the trailer frame 14 and connects to the carrier track 42 of the transfer platform 40. The drive device 78 powers the carrier track 42 to move the hay bales 12 to the conveyor tracks 64 of the conveyor device 20. The engagement between the drive device 78 and the conveyor track 64 can be accomplished by numerous methods known in the art to convert energy into transitional or rotational motion, including, but not limited to, gears, sprockets, chain drives, pistons, and the like.

The movement deck 22, also known as a roller deck 22 or a roller conveyor 22, includes a mechanical movement device 80 positioned on the movement deck 26 to direct the hay bales 12 onto the trailer frame 14. The mechanical movement device 80, which can also be called a plurality of rollers 80, can comprise numerous forms of devices designed to facilitate movement of heavy objects across a substantially flat surface. The mechanical movement device 80 is positioned to engage the hay bales 12 and carry the hay bales 12 to the trailer frame 14. The mechanical movement device 80 has a width that corresponds at least to the width of the hay bales 12 and a length that corresponds to at least the length of the hay bales 12.

The movement arm 28 includes a scissor type pushing ram 82 designed to move the hay bales 12 to the trailer frame 14 across the mechanical moving device 80 of the movement deck 26. The scissor type pushing ram 82 includes a plurality of guide rollers designed to engage a portion of the loading system frame 86 and to maintain a consistent direction for which the scissor type pushing ram 82 engages the hay bales 12.

Figure 8:
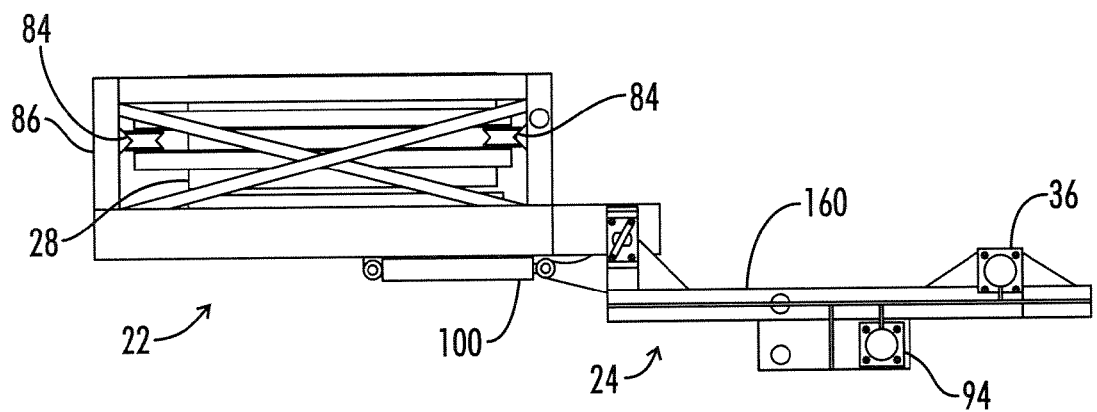
FIG. 8 is an isolated side view of the hay bale retrieving device and the movement arm.
Figure 9:
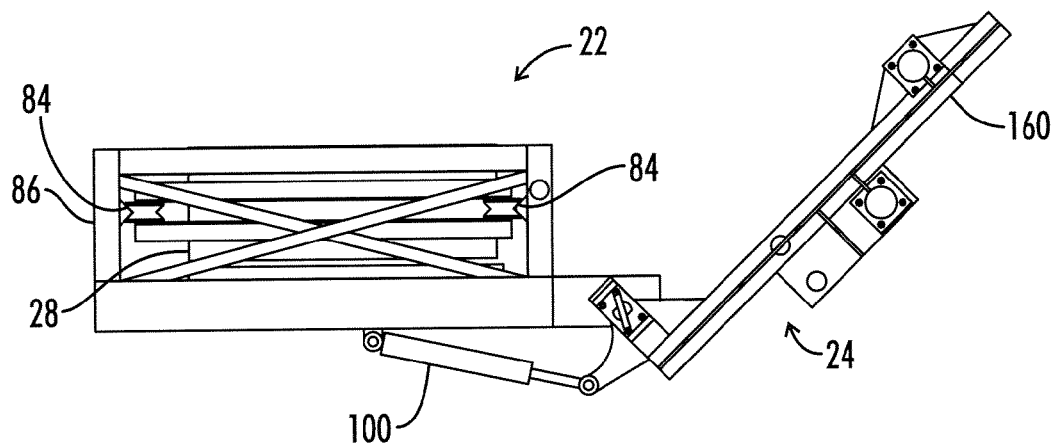
FIG. 9 is an isolated side view similar to FIG. 8.
Figure 10:
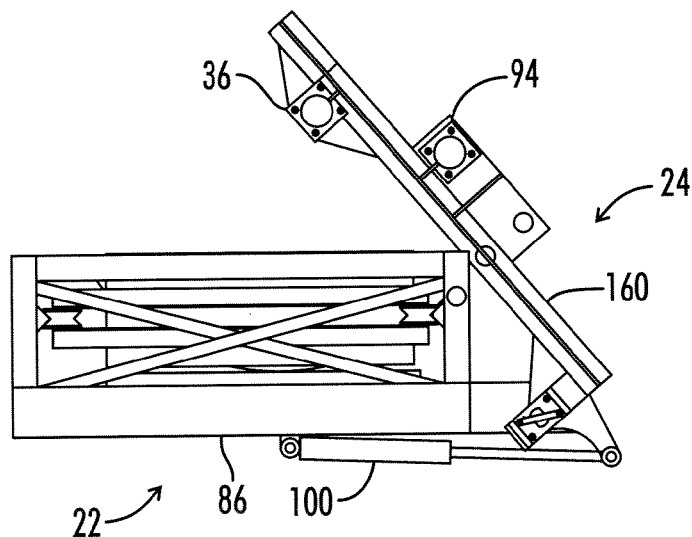
FIG. 10 is an isolated side view similar to FIGS. 8 and 9.

The hay bale retrieving device 24 is pivotally attached to the loading system 22 and has a rotational axis perpendicular to the first side 16 of the trailer frame 14. Specifically, the hay bale retrieving device 24 is attached to the loading system frame 86 and the hay bale retrieving device 24 rotates in a semicircle arc upward once the first spike 30 and second spike 32 impale a hay bale 12. As seen in FIGS. 8–10, the hay bale retrieving device 24 rotates through an arc that begins at a position parallel to the ground and ends at a position such that the first and second spikes 30 and 32 are positioned over the loading system 22. In a preferred embodiment, the hay bale retrieving device 24 includes third spike 88 and fourth spike 90 which impale the hay bales 12 through additional pistons 92 and 94. The spikes 30, 32, 88, and 90 lift the hay bales 12 onto the loading system 22.

The hay bale retrieving device 24 includes a first loading arm 160 attached to the first spike 30 and a second loading arm 162 attached to the second spike 32, wherein movement of the first loading arm 160 and second loading arm 162 loads the hay bale 12 onto the loading system 22.

The hay bale retrieving device 24 includes an indicating bar 144 positioned on the hay bale retrieving device 24 to indicate to a user of the apparatus 10 that a hay bale 12 is located within the retrieving device 24. In a preferred embodiment the indicating bar 144 is a bump bar 144 designed to engage the hay bale 12 and signal to a user of the apparatus 10 the presence of a hay bale 12 within the hay bale retrieving device 24.

Figure 5:
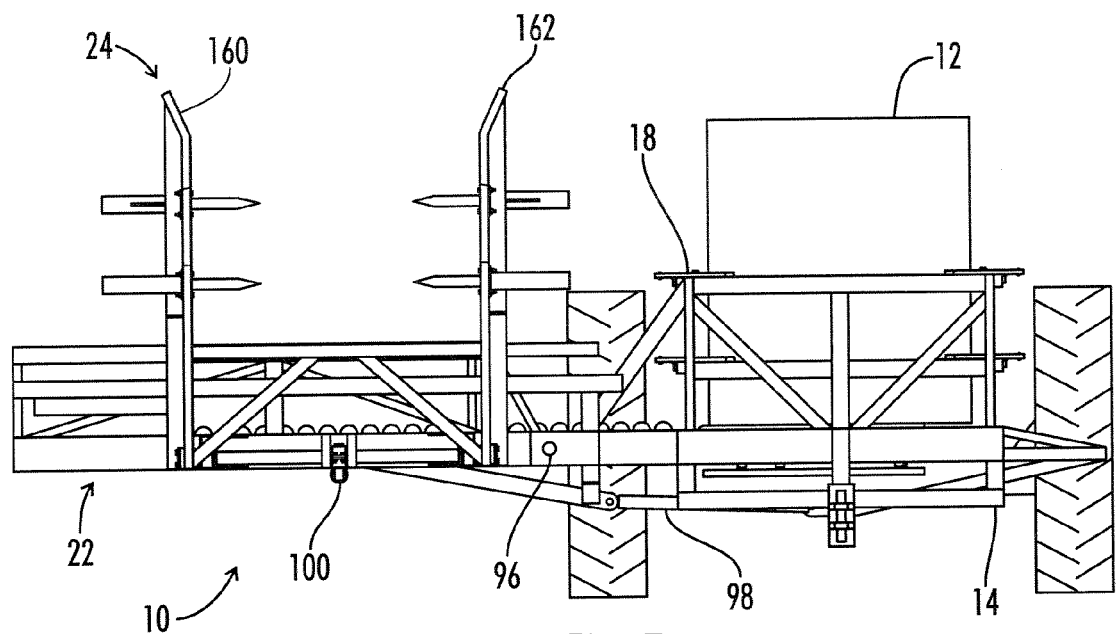
FIG. 5 is a front view of an apparatus of the present invention shown with the hay bale retrieving device raised to commence the transformation of the apparatus into the transport position.
Figure 6:
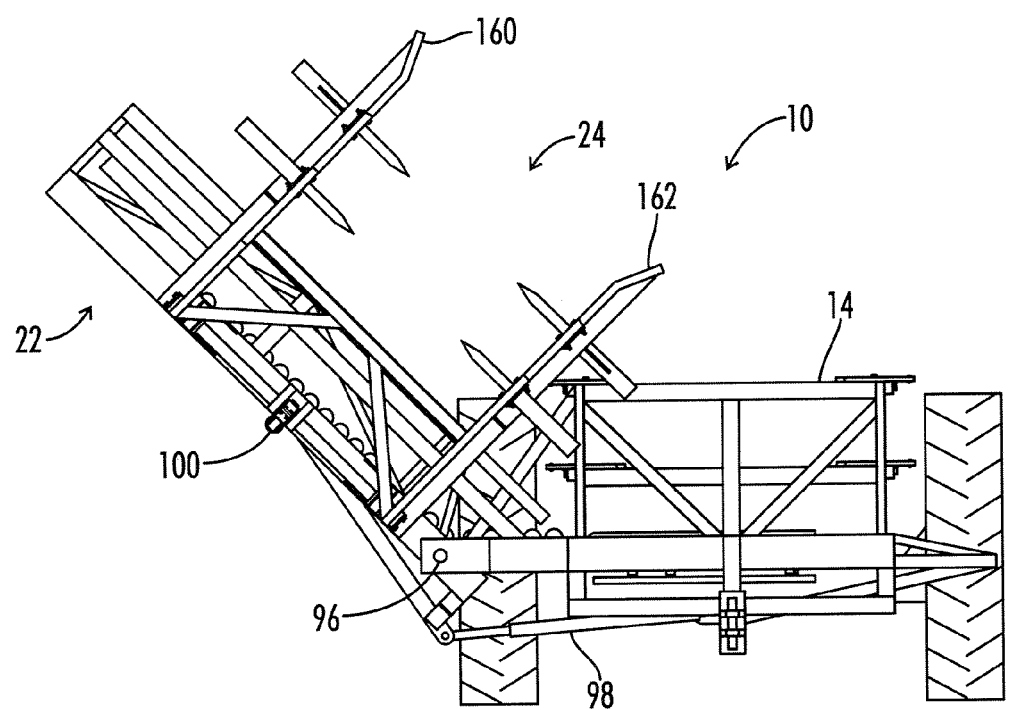
FIG. 6 is a front view of the apparatus similar to FIG. 5.
Figure 7:
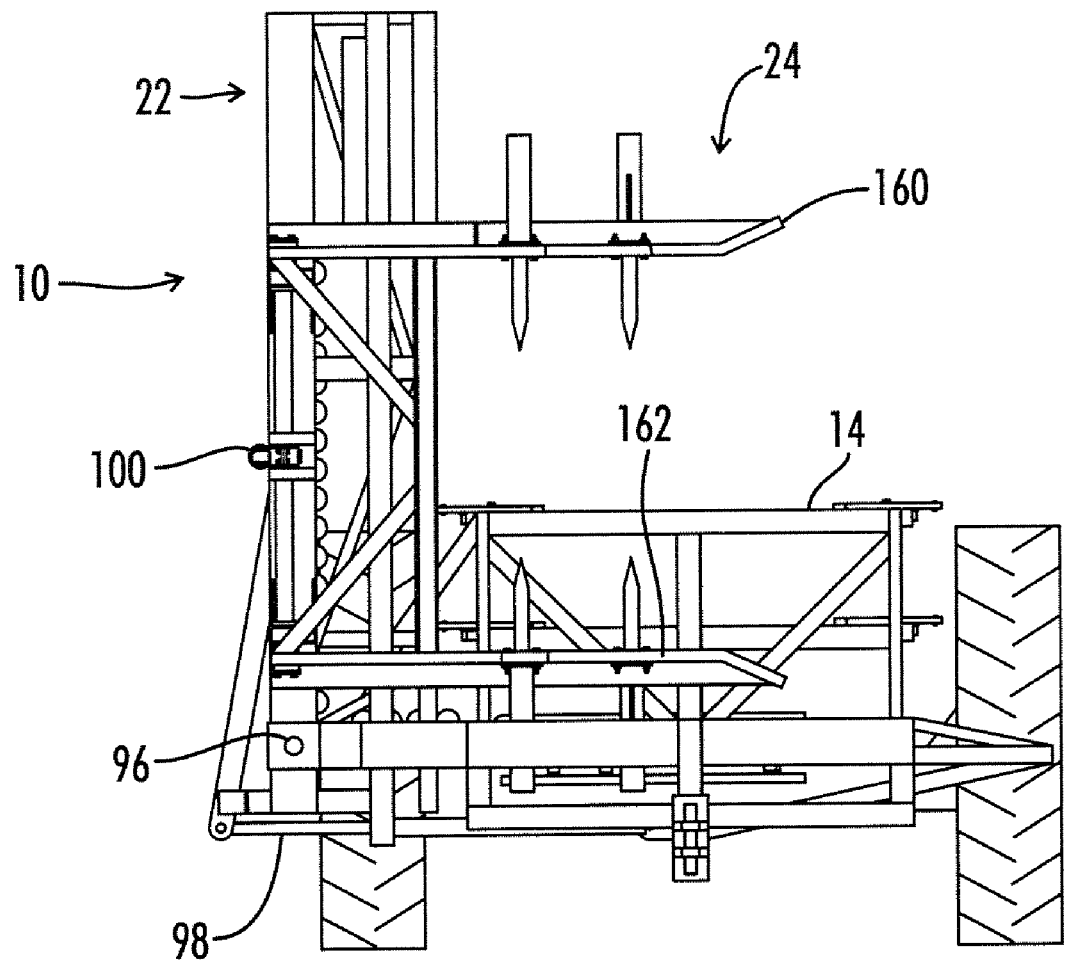
FIG. 7 is a front view of the apparatus similar to FIGS. 5 and 6.

A unique feature of the apparatus 10 is the fact that the loading system 22 is pivotally attached to the first side 16 of the trailer frame 14 and includes an axis of rotation 96 parallel to the first side 16 of the trailer frame 14. The loading system 22 is positioned to rotate about the axis of rotation 96 from a horizontal position to a vertical position as seen in FIGS. 5–7. This rotation allows the loading system 22 and the hay bale retrieving device 24 to move to a transport position as seen in FIGS. 2 and 7. This transport position allows the apparatus 10 to be easily maneuvered from one location to the next in order to facilitate loading and unloading of the apparatus 10. This transport position results in the loading system 22 and the hay bale retrieving device 24 to be contained within the footprint area of the trailer frame 14 during transportation of the apparatus 10. This rotational movement is facilitated by a transitional piston 98 located underneath the loading system 22 and trailer frame 14 and engaging both the loading system 22 and trailer frame 14.

The movement of the hay bale retrieving device 24 is facilitated through a loading piston 100 engaging both the loading system frame 86 and the hay bale retrieving device 24. The loading piston 100 is positioned beneath the loading system 22, and, when activated, rotates the hay bale retrieving device 24 in a semicircle arc to raise the hay bale 12 onto the movement deck 26. Once the hay bale retrieving device 24 has rotated to position the hay bales 12 over the moving deck 26, the first piston 34 and second piston 36 activate to remove the first spike 30 and second spike 32 from the hay bale 12. This action releases the hay bale 12 down to the movement deck 26 where the movement deck 26 and the movement arm 28 can facilitate movement of the hay bale 12 to the trailer frame 14.

As best seen in FIGS. 29–35, the apparatus 10 can include an adjustable counterweight system 200. The counterweight system 200 is attached to the trailer frame 14 and is positioned substantially opposite the loading system 22. The counterweight system 200 is designed to offset the weight of the loading system 22 and hay bales 12 as the hay bales 12 are loaded onto the apparatus 10 through the loading system 22. The counterweight system 200 is pivotally attached to the trailer frame 12 and preferably includes an axis of rotation 202 parallel to the trailer frame 14. The counterweight system 200 is positioned to rotate about the axis of rotation 202 between horizontal and vertical positions.

The counterweight system 200 includes weight 204 positioned on an armature 206 that extends from the trailer frame 14. The counterweight system 200 can be designed such that the weight 204 is affixed on the armature 206 or, alternately, the weight 204 can be attached to the armature 206 such that the weight 204 can be repositioned along the length of the armature 206.

Figure 33C:
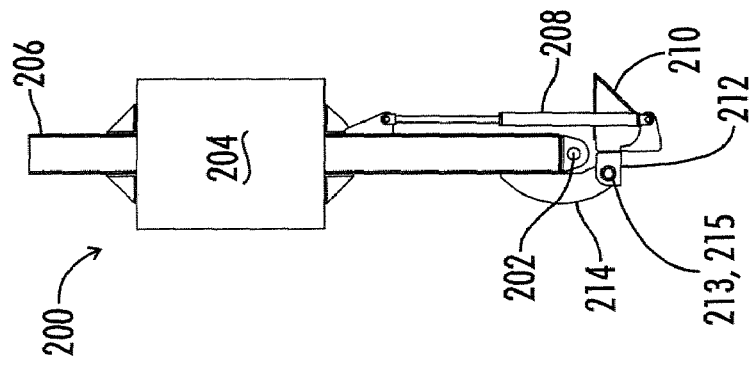
FIG. 33C shows an example of a counterweight system made in accordance with the current disclosure in a vertical position.
Figure 33B:
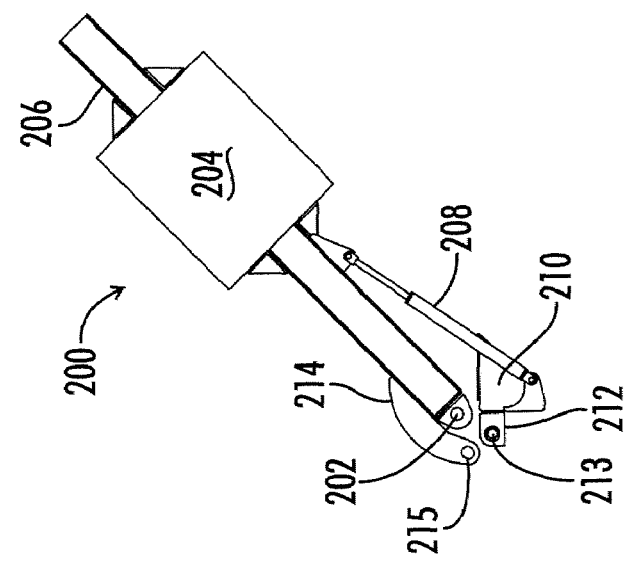
FIG. 33B shows an example of a counterweight system made in accordance with the current disclosure in transit between horizontal and vertical positions.
Figure 33A:
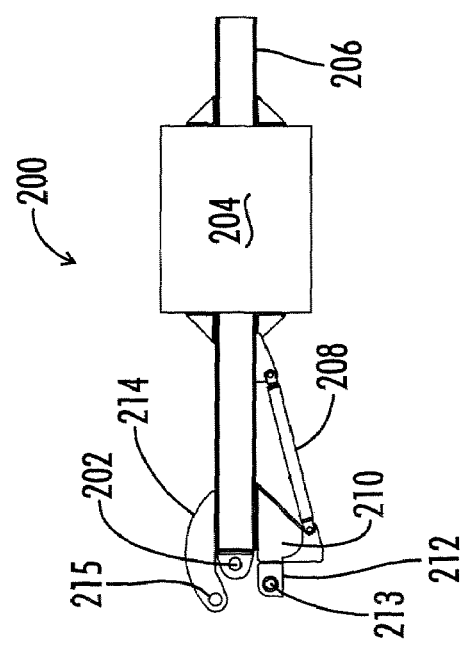
FIG. 33A shows a front view of a counterweight system made in accordance with the current disclosure in a horizontal position.
Figure 34:
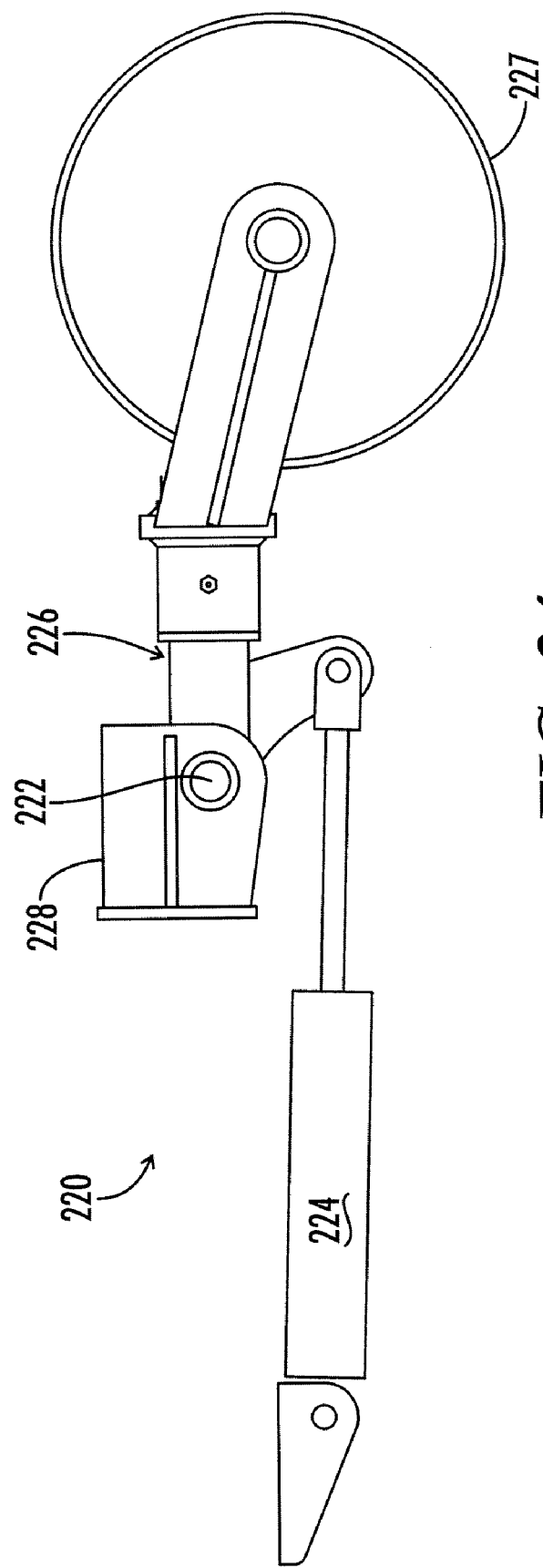
FIG. 34 shows a detailed view of a wheeled support made in accordance with the current disclosure.
Figure 35:
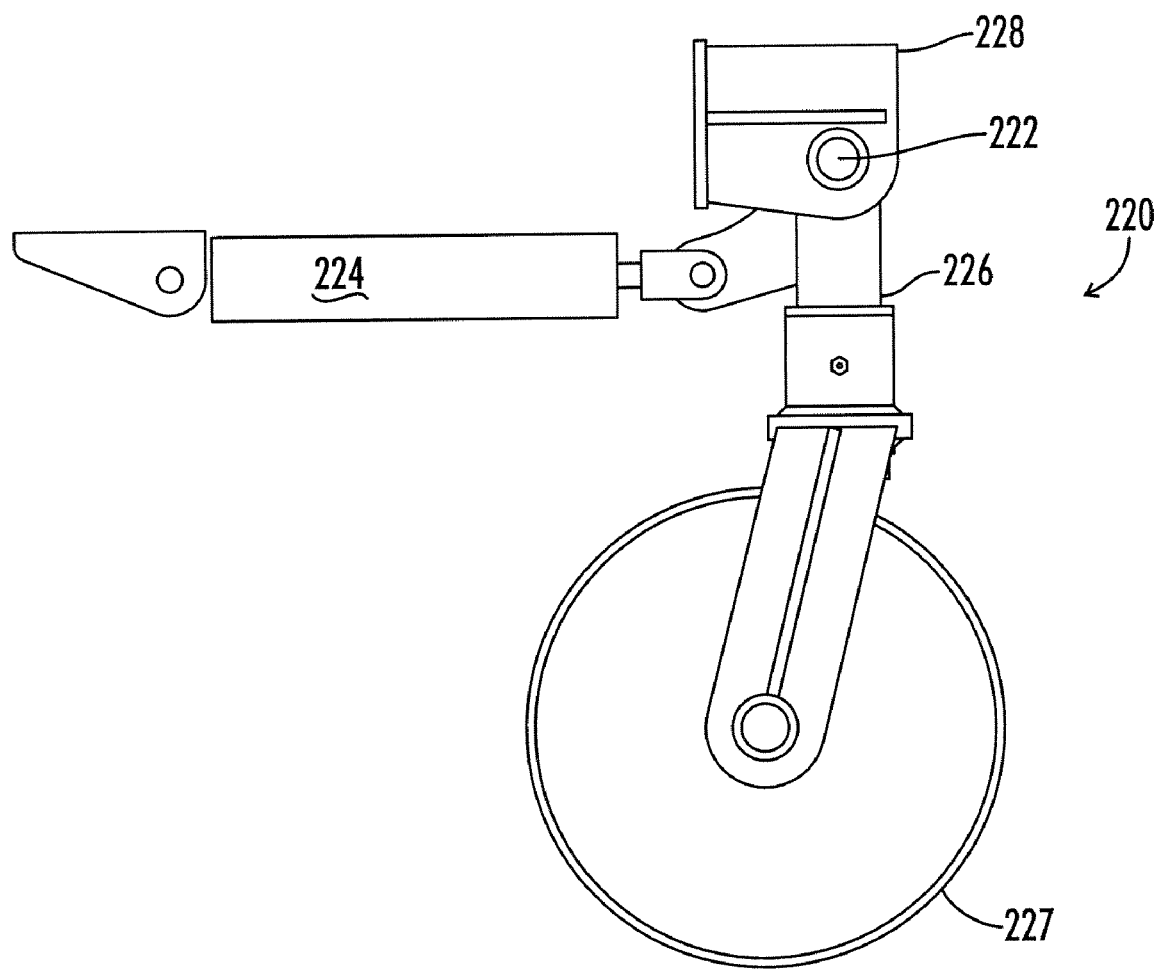
FIG. 35 is a detailed view of an embodiment of a wheeled support made in accordance with the current disclosure.

A lifting piston 208 can be used to raise and lower the weight 204 and armature 206. The lifting piston can be attached to the frame 14 at one end and the armature 206 at the opposite end. More specifically, the lifting piston 208 can be attached to a reinforced bracket 210 attached to the frame 114. A locking bracket 212 can extend from the frame 14 proximate the reinforced bracket 210. The locking bracket can interact with a corresponding locking device 214 extending from the armature 206, or within the armature 206, to lock the armature 206 and weight 204 in a vertical position during transfer of the apparatus. For example, as best shown in FIGS. 33A–C the locking device 214 can have aperture 215 that corresponds to the aperture 213 on locking bracket 212 such that a fastener, such as a pin, bolt, or the like, can be positioned through the apertures 213 and 215 to secure the counterweight system 200 during transfer of the apparatus 10.

The counterweight system 200 can preferably rotate at least 90 degrees between horizontal and vertical positions. The counterweight system 200 can be designed such that the armature 206 can rest on a portion of the frame 14 when in the horizontal position. The terms horizontal and vertical as used throughout this application are meant to be substantially horizontal and substantially vertical and are not meant to be construed as precisely horizontal or precisely vertical.

Also shown in FIGS. 29–35 is an adjustable support wheel 220. The adjustable support wheel 220 is preferably vertically adjustable such that the support wheel 220 can move in and out of contact with the ground during operation and transport of the apparatus when additional support is needed due to the weight of the hay bales 12 and loading system 22. The support wheel 220 is preferably attached to the loading system 22 opposite the attachment between the loading system 22 and the trailer frame 14. In a more preferred embodiment the adjustable support wheel 22 is attached to the movement deck 26 distal from the trailer frame 14.

In a more preferred embodiment the adjustable support wheel 220 is independently adjustable with respect to the movement deck 26. This can be accomplished by a pivotal attachment of the support wheel 220 to the loading system 22 to rotate the support wheel 220 between horizontal and vertical positions. In this embodiment, the support wheel 220 includes an axis of rotation 222 such that the support wheel 220 rotates about the axis of rotation 222. A lifting piston 224 can be used to rotate the support wheel 220 between the horizontal and vertical positions about the axis of rotation 222. Additionally, the support wheel 220 can be designed such that it has a full 360 degree rotation about the stanchion 226 which attaches the wheel 227 to the axis of rotation 222 located in the attachment bracket 228. One end of a lifting piston 224 can be attached to one location on the movement deck 26 while the attachment bracket 228 can be connected to the movement deck 26 at an alternate location thereby allowing the movement of the support wheel 220 about the axis of rotation 222. This is best illustrated in FIGS. 29, 31, 34, and 35.

The lifting pistons 208 and 224 can be pistons and cylinders, such as a hydraulic cylinder, known in the art to move items.

Double Level Embodiment

The apparatus 10' for loading, transporting, and unloading hay bales 12 can also be described as comprising a base trailer frame 14 that includes a base loading end 38, a first side 16, and a base length 18, a top trailer frame 104 attached to the base trailer frame 14 and including a top loading end 106, a conveyor device 20 attached to the base trailer frame 14 and positioned to transport the hay bales 12 a majority of the base length 18, a loading system 22 attached to the first side 16 of the base trailer frame 14, a hay bale retrieving device 24 pivotally attached to the loading system 22, and a lifting system 108 attached to the top loading end 106. The top trailer frame 104 includes a top length 120 that is shorter than the base length 18.

The retrieving device 24 includes a first base spike 30 and second base spike 32 positioned opposed to the first base spike 30, wherein both base spikes 30 and 32 are positioned to engage the hay bales 12 and lift the hay bales 12 onto the movement deck 26 of the loading system 22. The lifting system 108 includes a first top spike 110 and a second top spike 112 positioned opposed to the first top spike 110, wherein both top spikes 110 and 112 are positioned to engage the hay bales 12 and lift the hay bales 12 onto the top trailer frame 104.

This apparatus 10' further includes plurality of stanchions 114 attached to the top loading end 106 and the base-loading end 38. The stanchions 114 are positioned to space the top trailer frame 104 from the base trailer frame 14. The stanchions 114 provide support for and facilitate the placement of the top trailer frame 104 relative to the base trailer frame 114.

Also, a plurality of location pistons 116 engages the base trailer frame 14 and the top trailer frame 104. The location pistons 116 are positioned to vary the location of the top trailer frame 104 relative to the base trailer frame 14. The location pistons 116 are positioned distal from the base loading end 38 and the top loading end 106. The location pistons 116 are designed to lower and raise the top unloading end 126 of the top trailer frame 104 in order to facilitate the unloading of the hay bales 12 from the top trailer frame 104.

The base trailer frame 14 includes a transfer platform 40 attached to the base loading end 38, a base unloading end 66, and a base rear gate 68. The transform platform 40 includes a carrier track 42 positioned to transfer the hay bales 12 to the conveyor device 20. The base rear gate 68 is pivotally attached to the base unloading end 66 and is positioned to release the hay bales 12 as the hay bales 12 approach the base unloading end 66.

The apparatus 10' further includes a third piston 122 attached to the first top spike 110 and a fourth piston 124 attached to the second top spike 112, wherein the third and fourth pistons 122 and 124 are positioned to removably impale the first and second top spikes 110 and 112 into the hay bales 12.

The top trailer frame 104 includes a top unloading end 126 and a top rear gate 128 pivotally attached to the top unloading end 126 and positioned to release the hay bales 12 as the hay bales 12 approach the top unloading end 126 of the top trailer frame 104.

The apparatus 10' is designed to load hay bales 12 on the base trailer frame 14 then to load hay bales 12 from the transfer platform 40 of the base trailer frame 14 onto the top trailer frame 104. The top trailer frame 104 includes a top front gate 130 positioned near the top loading end 106 of the top trailer frame 104. The top front gate 130 is positioned to retain hay bales 12 that are loaded onto the top trailer frame 104 from departing the top loading end 106 of the top trailer frame 104.

Figure 22:
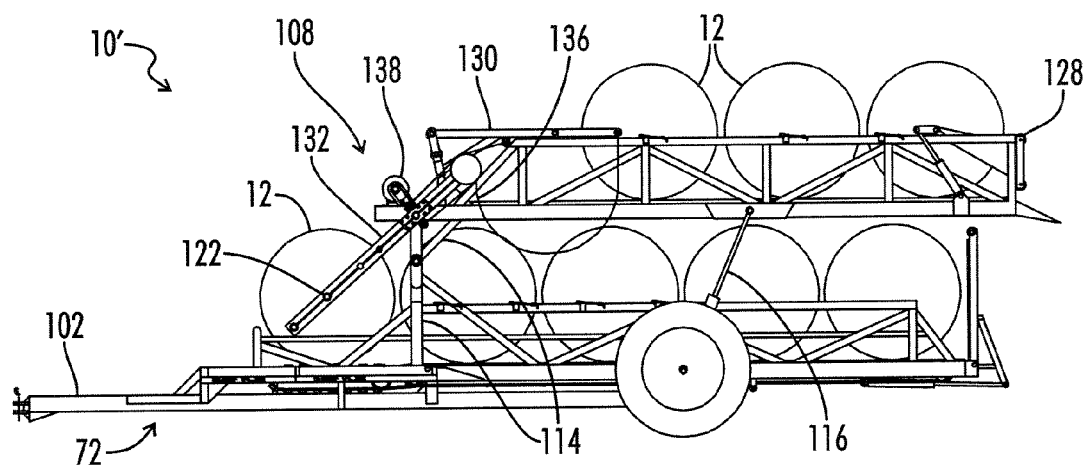
FIG. 22 is a side view of the apparatus shown in FIG. 20. This view shows the lifting system engaging a hay bale and commencing to move the hay bale to the top trailer frame.
Figure 23:
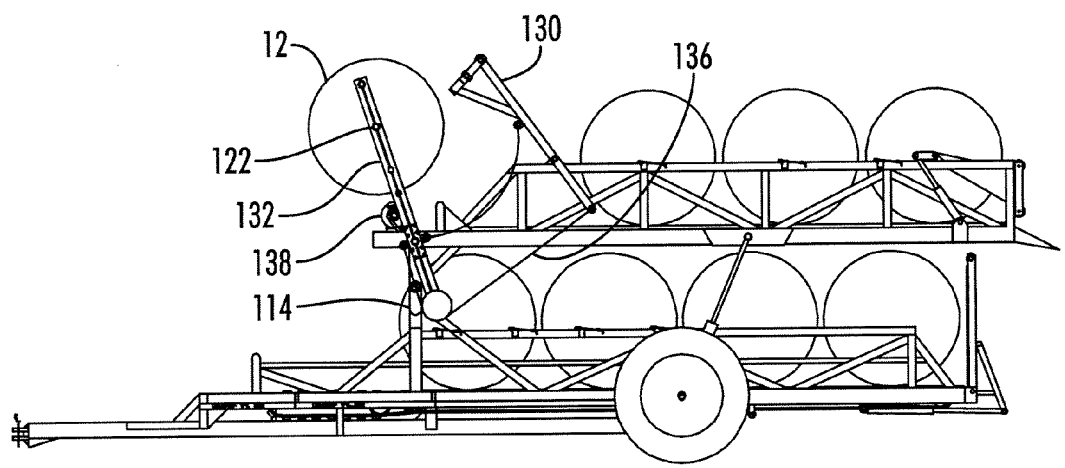
FIG. 23 is a side view similar to FIG. 22.

The lifting system 108 includes a first lifting arm 132 attached to the first top spike 110, a second lifting arm 134 attached to the second top spike 112, and a cable 136 attached to the first lifting arm 132 and the top front gate 130, wherein movement of the first lifting arm 132 opens the top front gate 130. The top front gate 130 is pivotally attached to the top trailer frame 104, so that force applied to the top front gate 130 by the cable 136 causes the top front gate 130 to open and allow placement of a hay bale 12 onto the top trailer frame 104 as seen in FIGS. 22 and 23. The lifting system 108 includes a motor 138 engaging the first lifting arm 32 and second lifting arm 34 to raise the first and second lifting arms 132 and 134.

The first and second lifting arms 132 and 134 engage the first top spike 110 and second top spike 112 as well as the third piston 122 and fourth piston 124. The third piston 122 and the fourth piston 124 impale the first top spike 110 and second top spike 112 into the hay bales 12. Once the hay bales 12 are secured, the motor 138 activates to raise the first lifting arm 132 and second lifting arm 134 in order to raise the hay bales 12 up to a height which the hay bales 12 can be loaded onto the top trailer frame 104. The interaction between the motor 138 and the lifting arms 132 and 134 can be accomplished by numerous techniques known in the art to connect a motor to lifting elements.

Figure 24:
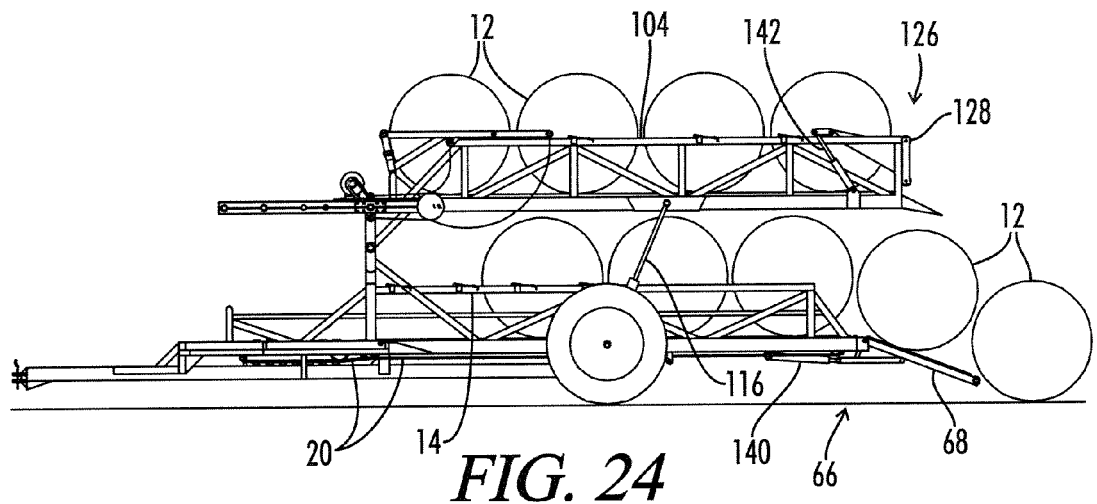
FIG. 24 is a side view of the embodiment of the invention depicted in FIG. 20.
Figure 25:
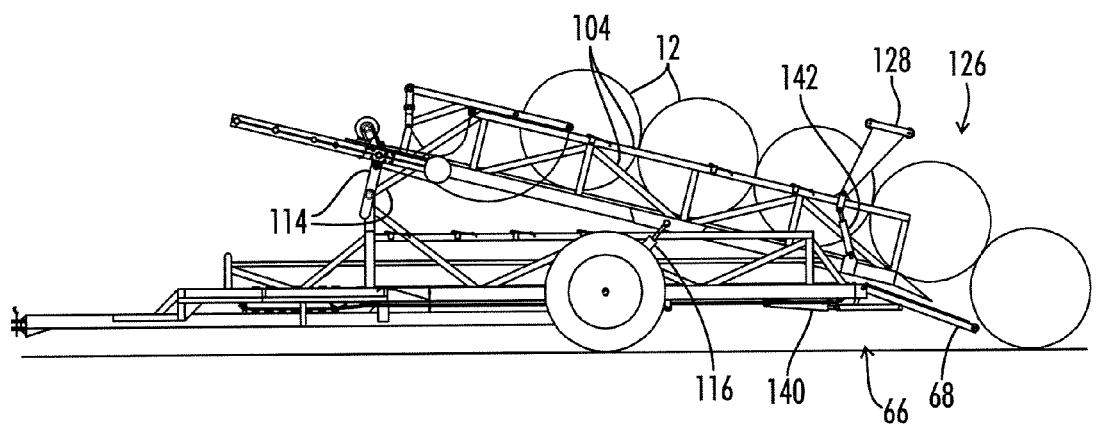
FIG. 25 is a side view similar to FIG. 24.
Figure 26:
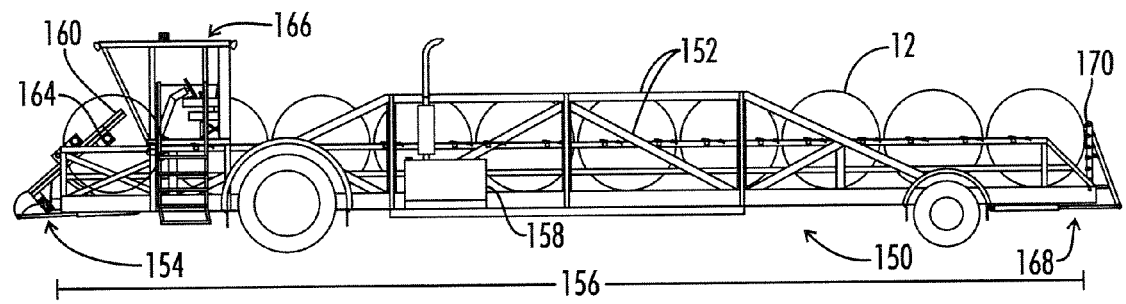
FIG. 26 is a side view of a vehicle of the current invention.
Figure 27:
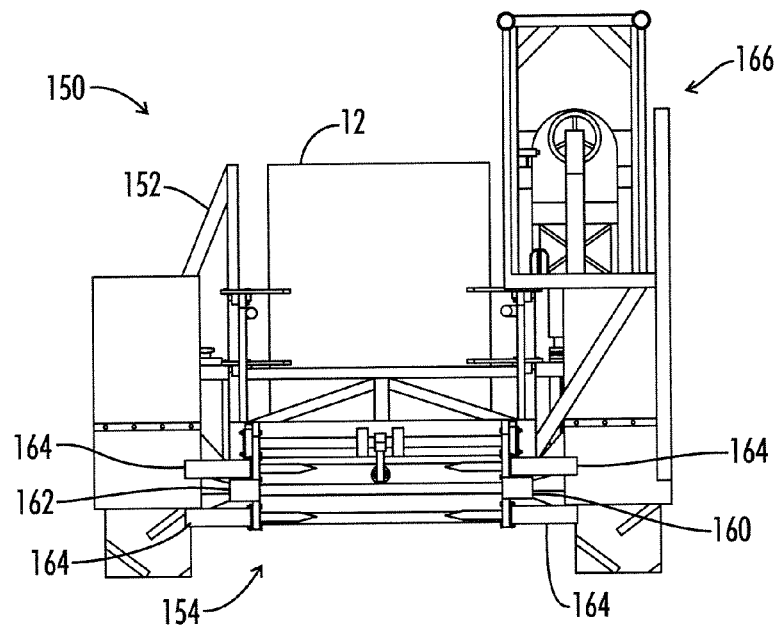
FIG. 27 is a front view of the vehicle of the current invention.
Figure 28:
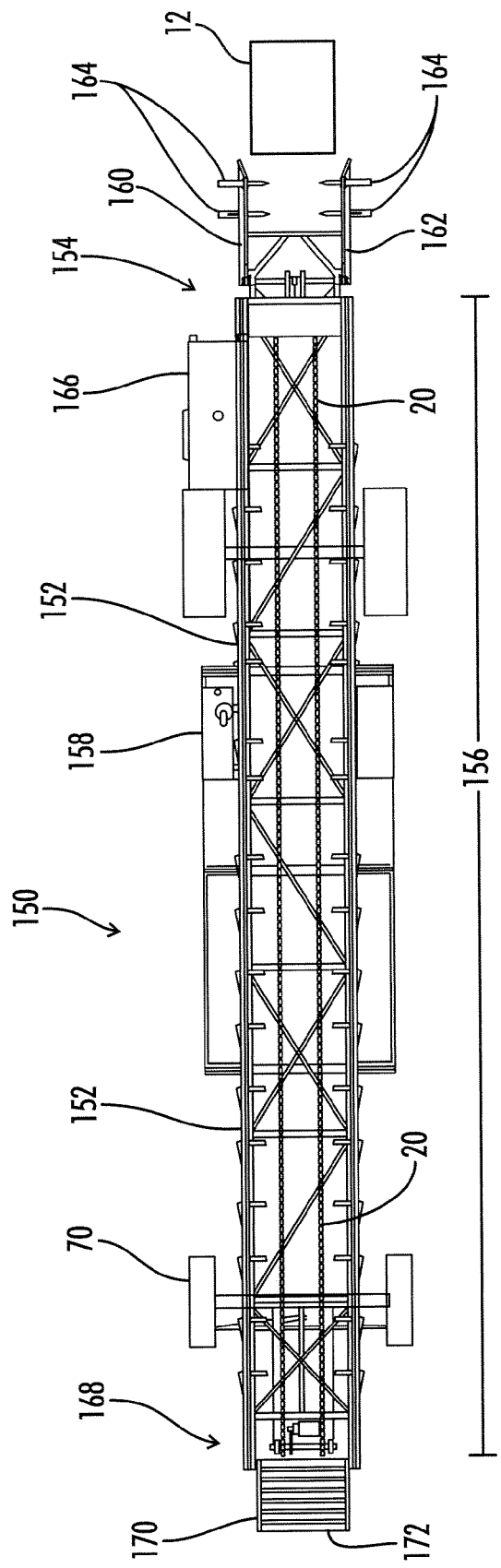
FIG. 28 is a top view of the vehicle of the current invention approaching a hay bale.
Figure 29:
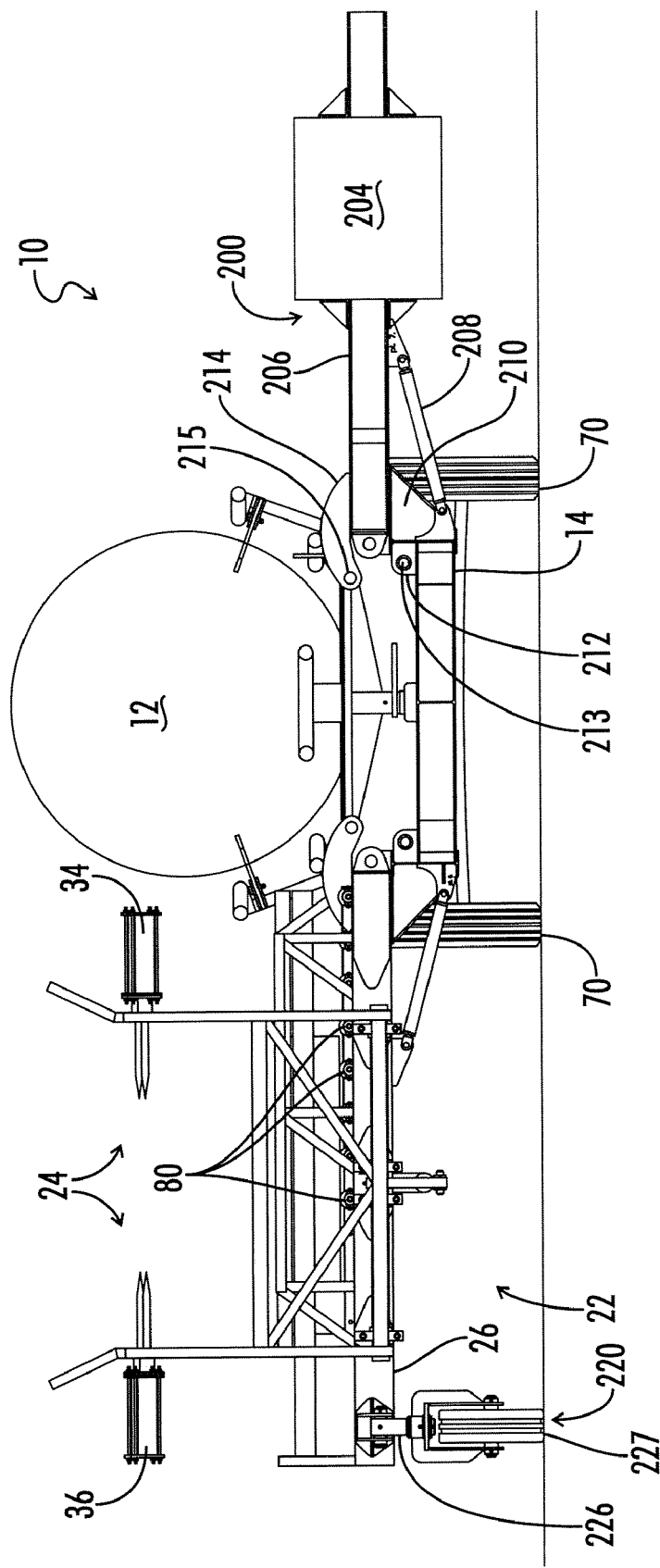
FIG. 29 is a front view of an apparatus made in accordance with the current disclosure.
Figure 30:
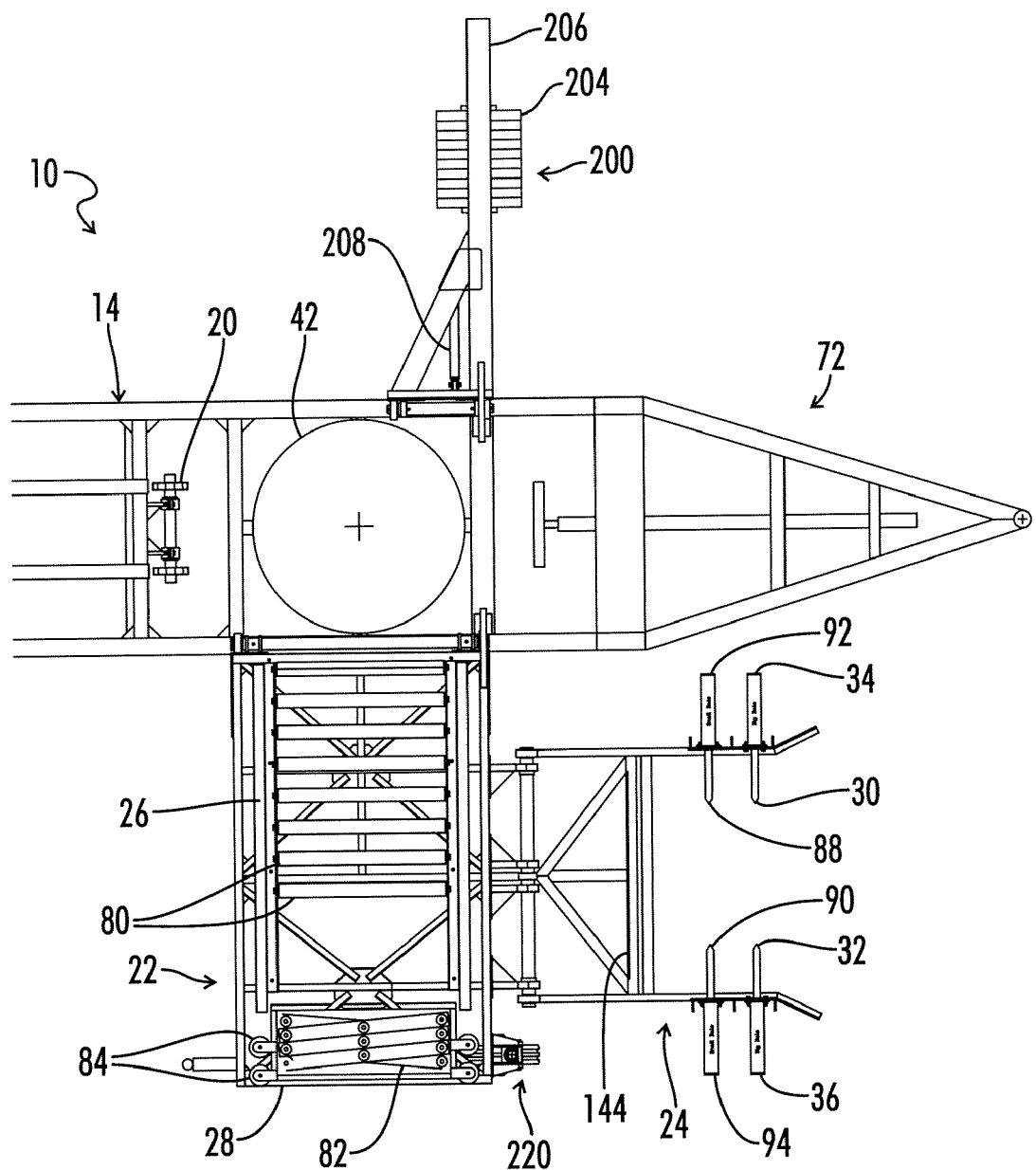
FIG. 30 shows a top partial view of an apparatus made in accordance with the current disclosure.
Figure 31:
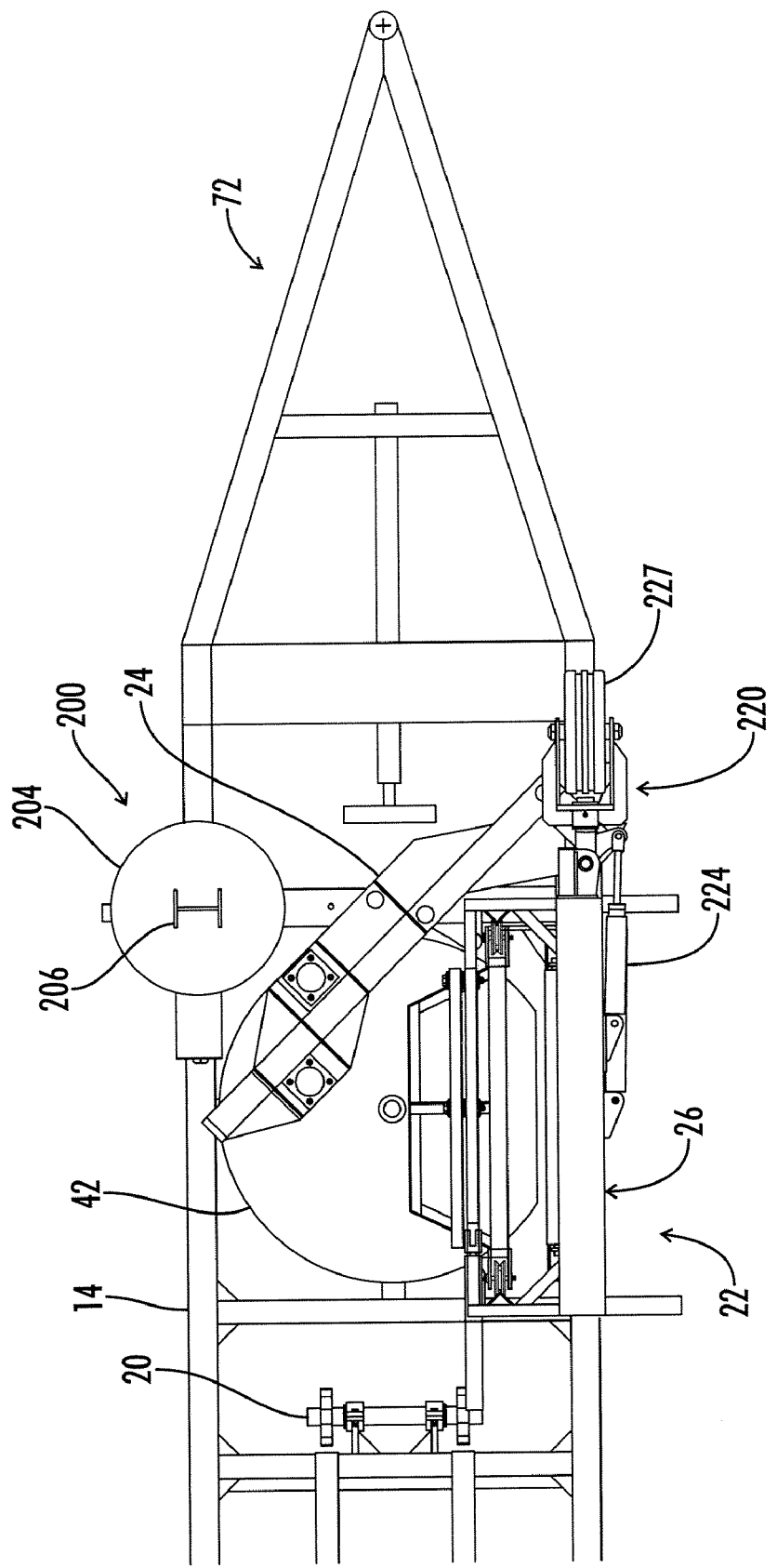
FIG. 31 is a top view similar to FIG. 30.
Figure 32:
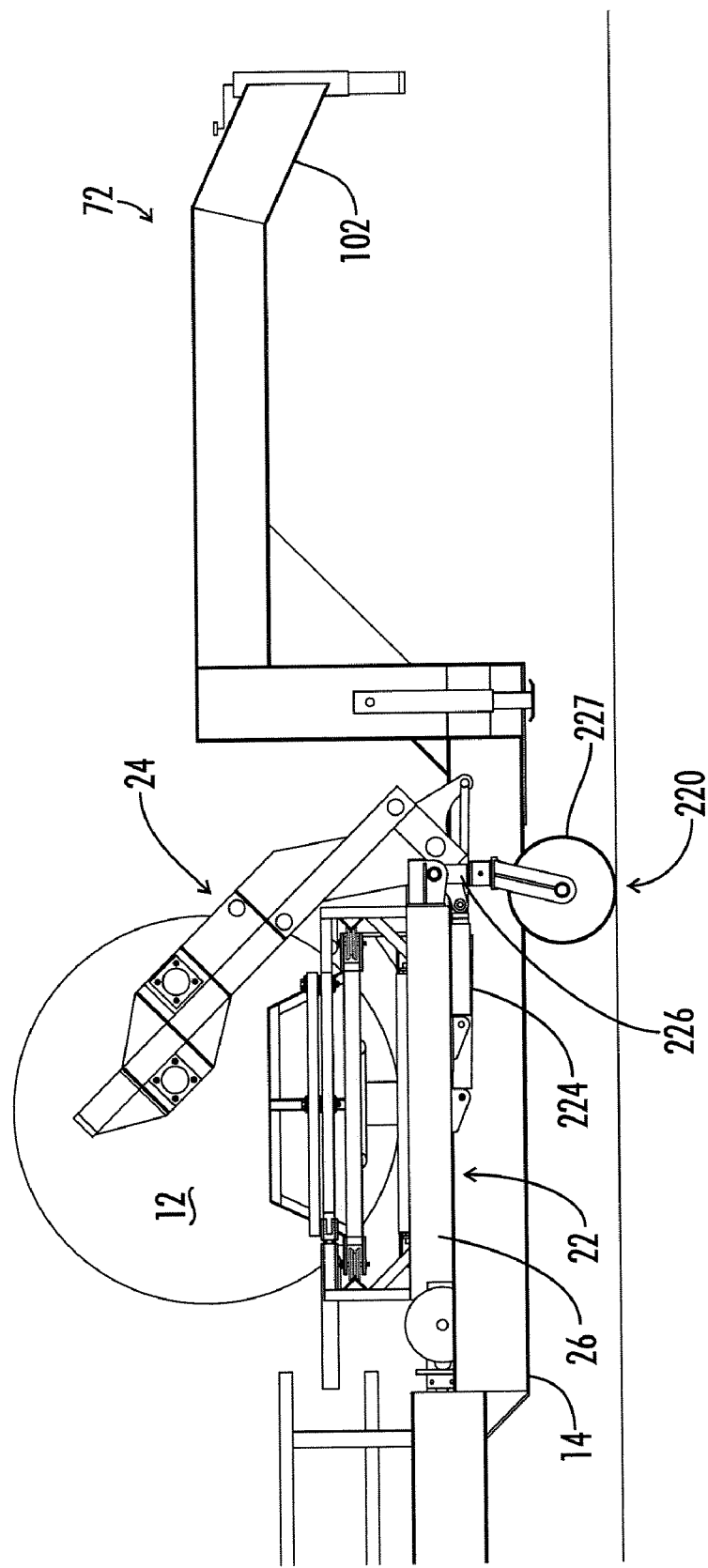
FIG. 32 shows a partial side view of an apparatus made in accordance with the current disclosure. This view is taken on the loading system side of the apparatus and shows an example of the positioning of the wheeled support during operation of the apparatus.

When it is desired for the hay bales 12 to be unloaded from the apparatus 10', the base rear gate 68 is lowered with the use of a rear gate piston 140 as seen in FIG. 24. The conveyor device 20 is then activated to unload the hay bales 12 on the base trailer frame 14. Once all of the hay bales 12 are unloaded from the base trailer frame 14, the location pistons 116 are activated to lower the top trailer frame 104 to a position to where the hay bales 12 that are on the top trailer frame 104 can be unloaded, as seen in FIG. 25. The top rear gate 128 is then opened by the activation of the top rear gate piston 142 to allow the hay bales 12 to unload from the top trailer frame 104.

Additionally, the apparatus 10' can include the counterweight system 200 and support wheel 220 as generally described above.

Vehicle Embodiment

A vehicle 150 for loading, transporting, and unloading hay bales 12 is also disclosed. The vehicle 150, also described as a tractor model 150, comprises a vehicle frame 152 including a vehicle loading end 154 and a vehicle length 156, an engine 158 attached to the vehicle frame 152, a conveyor device 20 attached to the vehicle frame 152, and a hay bale retrieving device 24 pivotally attached to the vehicle loading end 154. The conveyor device 20 is positioned on the vehicle frame 152 to transport the hay bales 12 a majority of the vehicle length 156. The hay bale retrieving device 24 includes a first spike 30 and a second spike 32 positioned opposed to the first spike 30. Both spikes 30 and 32 are positioned to engage the hay bales 12 and lift the hay bales 12 onto the vehicle frame 152.

The hay bale retrieving device 24 of the vehicle 150 further includes a first loading arm 160 connecting the vehicle loading end 154 and the first spike 30. The hay bale retrieving device also includes a second loading arm 162 connecting the vehicle loading end 154 and the second spike 32. Hay bale retrieving device is located extending from the vehicle loading end 154 of the vehicle 150. The location allows user of the vehicle 150 to easily align with, engage, and load hay bales 12 onto the vehicle 150.

The hay bale retrieving device 24 is manipulated in a semicircular arc in order to load the hay bales 12 onto the vehicle frame 152. In a preferred embodiment this manipulation is accomplished through loading pistons 164 connecting the first loading arm 160 and second loading arm 162 to the vehicle frame 152.

The vehicle 150 further includes a control station 166 attached to the vehicle frame 152 near the vehicle loading end 154. The control station 166 operatively engages the engine 158, the conveyor device 20, and the hay bale retrieving device 24. The control station 166 is designed to provide for a user (not shown) of the vehicle 150 to operate the vehicle from within the spatial parameters of the control station 166.

The vehicle 150 further includes a first piston 34 attached to the first spike 30 and second piston 36 attached to the second spike 32. The first and second pistons 34 and 36 are positioned to removably impale the first and second spikes 30 and 32 onto the hay bales 12. The first and second pistons 34 and 36 are attached to the first and second arms 160 and 162. In a preferred embodiment the vehicle 150 includes a third spike 88 and a fourth spike 90 and additional pistons 92 and 94 to increase the secured engagement between the hay bale retrieving device 24 and the hay bale 12 during the loading of the hay bale 12 onto the vehicle 150.

The conveyor device 20 of the vehicle 150 further includes a plurality of conveyor tracks 64 positioned on the vehicle frame 152 to engage the hay bales 12 and transport the hay bales 12 the majority of the vehicle length 156 of the vehicle frame 152.

The vehicle frame 152 includes a vehicle unloading end 168 and a vehicle rear gate 170 pivotally attached to the vehicle-unloading end 168. The vehicle rear gate 170 is positioned to release the hay bales 12 as the hay bales 12 approach the vehicle-unloading end 168. In a preferred embodiment, the vehicle rear gate 170 includes a plurality of rollers 172 to facilitate the movement of the hay bales 12 across the vehicle rear gate 170 and off the vehicle 150.

One of ordinary skill in the art will understand the dimensions and exact operation of any embodiment of the present invention may change to mirror the exact size and shapes of the hay bales that are to be loaded, transported, and unloaded. These changes would still be within the inventive spirit of the invention as thus disclosed.

Thus it is seen that the apparatus and methods of the present invention readily achieves the ends and advantages mentioned, as well as those inherent therein. While certain preferred embodiments of the invention have been illustrated and described for purposes of the present disclosure, numerous changes in the arrangement and construction of parts and steps may be made by those skilled in the art, which changes are encompasses within the scope and spirit of the present invention as defined by the appended claims. Although there have been described particular embodiments of the present invention of a new and useful Improved Hay Bale Loader and Hauler, it is not intended that such references be construed as limitations upon the scope of this invention except as set forth in the appended claims.

What is claimed is:

1. An apparatus for loading, transporting, and unloading hay bales, comprising:
   a trailer frame including a first side and a length;
   a conveyor device attached to the trailer frame and positioned to transport the hay bales a majority of the length of the trailer frame;
   a loading system attached to the first side of the trailer frame and including a movement deck, a movement arm positioned to move the hay bales across the movement deck and to the trailer frame, and a vertically adjustable support wheel attached to the loading system opposite the trailer frame;
   a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;

an adjustable counter weight system attached to the trailer frame and positioned substantially opposite the loading system; and wherein the counter weight system is pivotally attached to the trailer frame, includes an axis of rotation parallel to the trailer frame, and is positioned to rotate about the axis of rotation between horizontal and vertical positions.

2. An apparatus for loading, transporting, and unloading hay bales, comprising:

a trailer frame including a first side and a length;

a conveyor device attached to the trailer frame and positioned to transport the hay bales a majority of the length of the trailer frame;

a loading system attached to the first side of the trailer frame and including a movement deck, a movement arm positioned to move the hay bales across the movement deck and to the trailer frame, and a vertically adjustable support wheel attached to the loading system opposite the trailer frame;

a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;

an adjustable counter weight system attached to the trailer frame and positioned substantially opposite the loading system; and wherein the support wheel is pivotally attached to the loading system to rotate between horizontal and vertical positions.

3. The apparatus of claim 2, wherein the support wheel includes an axis of rotation parallel to the movement deck and is positioned to rotate about the axis of rotation.

4. The apparatus of claim 2, wherein the trailer frame includes an unloading end and a rear gate pivotally attached to the unloading end and positioned to release the hay bales as the hay bales approach the unloading end of the trailer frame.

5. The apparatus of claim 2, wherein the conveyor device includes:

a plurality of conveyor tracks positioned to engage the hay bales and transport the hay bales the majority of the length of the trailer frame; and a drive device positioned to engage and transfer the conveyor tracks.

6. The apparatus of claim 2, wherein the movement deck includes plurality of rollers positioned to engage the hay bales and transport the hay bales to the trailer frame.

7. An apparatus for loading, transporting, and unloading hay bales, comprising:

a trailer frame including a first side and a length;

a conveyor device attached to the trailer frame and positioned to transport the hay bales a majority of the length of the trailer frame;

a loading system attached to the first side of the trailer frame and including a movement deck, a movement arm positioned to move the hay bales across the movement deck and to the trailer frame, and a vertically adjustable support wheel attached to the loading system opposite the trailer frame;

a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;

an adjustable counter weight system attached to the trailer frame and positioned substantially opposite the loading system;

wherein the trailer frame includes a loading end and a transfer platform located near the loading end, the transfer platform including a carrier track positioned to transfer the hay bales to the conveyor device; and wherein the transfer platform further includes a plurality of rotational devices engaging the trailer frame and positioned to rotate the transfer platform relative to the trailer frame.

8. An apparatus for loading, transporting, and unloading hay bales, comprising:

a trailer frame including a first side and a length;

a conveyor device attached to the trailer frame and positioned to transport the hay bales a majority of the length of the trailer frame;

a loading system attached to the first side of the trailer frame and including a movement deck, a movement arm positioned to move the hay bales across the movement deck and to the trailer frame, and a vertically adjustable support wheel attached to the loading system opposite the trailer frame;

a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;

an adjustable counter weight system attached to the trailer frame and positioned substantially opposite the loading system; and wherein the movement arm includes a scissor type pushing ram.

9. An apparatus for loading, transporting, and unloading hay bales, comprising:

a trailer frame including a first side and a length;

a conveyor device attached to the trailer frame and positioned to transport the hay bales a majority of the length of the trailer frame;

a loading system attached to the first side of the trailer frame and including a movement deck, a movement arm positioned to move the hay bales across the movement deck and to the trailer frame, and a vertically adjustable support wheel attached to the loading system opposite the trailer frame;

a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;

an adjustable counter weight system attached to the trailer frame and positioned substantially opposite the loading system; and wherein the loading system is pivotally attached to the first side of the trailer frame, includes an axis of rotation parallel to the first side of the trailer frame, and is positioned to rotate about the axis of rotation between horizontal and vertical positions.

10. An apparatus for loading, transporting, and unloading hay bales, comprising:
a trailer frame including a first side and a length;
a conveyor device attached to the trailer frame and positioned to transport the hay bales a majority of the length of the trailer frame;
a loading system pivotally attached to the first side of the trailer frame about an axis of rotation parallel to the first side of the trailer frame, the loading system positioned to rotate about the axis of rotation between horizontal and vertical positions, the loading system including a movement deck and a movement arm positioned to move the hay bales across the movement deck and to the trailer frame;
a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales;
an adjustable counter weight system attached to the trailer frame and positioned substantially opposite the loading system.

11. The apparatus of claim 10, wherein the counter weight system is pivotally attached to the trailer frame, includes an axis of rotation parallel to the trailer frame, and is positioned to rotate about the axis of rotation between horizontal and vertical positions.

12. The apparatus of claim 10, the loading system further including a vertically adjustable support wheel pivotally attached to the loading system opposite the trailer frame and rotatable between horizontal and vertical positions.

13. The apparatus of claim 12, wherein the support wheel includes an axis of rotation parallel to the movement deck.

14. The apparatus of claim 10, wherein the trailer frame includes a loading end and a transfer platform located near the loading end, the transfer platform including a carrier track positioned to transfer the hay bales to the conveyor device and a plurality of rotational devices engaging the trailer frame and positioned to rotate the transfer platform relative to the trailer frame.

15. The apparatus of claim 10, wherein the movement arm includes a scissor type pushing ram.

16. An apparatus for loading, transporting, and unloading hay bales, comprising:
a trailer frame including a first side and a length;
a conveyor device attached to the trailer frame and positioned to transport the hay bales a majority of the length of the trailer frame;
a loading system pivotally attached to the first side of the trailer frame about an axis of rotation parallel to the first side of the trailer frame, the loading system positioned to rotate about the axis of rotation between horizontal and vertical positions, the loading system including a movement deck, a movement arm positioned to move the hay bales across the movement deck and to the trailer frame, and a vertically adjustable support wheel pivotally attached to the loading system opposite the trailer frame and rotatable between horizontal and vertical positions; and
a hay bale retrieving device pivotally attached to the loading system, positioned to transport hay bales to the movement deck, and including a first spike and a second spike positioned opposed to the first spike, a first piston attached to the first spike, and a second piston attached to the second spike, wherein the first and second pistons are positioned to removably impale the first and second spikes into the hay bales.

17. The apparatus of claim 16, further including an adjustable counter weight system pivotally attached to the trailer frame and positioned substantially opposite the loading system, the counter weight system including an axis of rotation parallel to the trailer frame.

18. The apparatus of claim 16, wherein the support wheel includes an axis of rotation parallel to the movement deck.

* * * * *